US012467607B2

(12) United States Patent
Williams et al.

(10) Patent No.: US 12,467,607 B2
(45) Date of Patent: Nov. 11, 2025

(54) STORAGE LIGHTS AND MOUNTING STRUCTURES FOR THE SAME

(71) Applicant: TECHTRONIC CORDLESS GP, Anderson, SC (US)

(72) Inventors: Brianna E. Williams, Greenville, SC (US); Jeffrey Groves, Greenville, SC (US); Tyler H. Knight, Greenville, SC (US); Connor Irwin, Greenville, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

(21) Appl. No.: 18/119,964

(22) Filed: Mar. 10, 2023

(65) Prior Publication Data

US 2023/0288046 A1 Sep. 14, 2023

Related U.S. Application Data

(60) Provisional application No. 63/319,209, filed on Mar. 11, 2022.

(51) Int. Cl.

| | |
|---|---|
| ***F21V 21/02*** | (2006.01) |
| ***F21S 2/00*** | (2016.01) |
| ***F21V 21/08*** | (2006.01) |
| ***F21V 21/088*** | (2006.01) |
| ***F21V 21/096*** | (2006.01) |
| ***F21V 21/30*** | (2006.01) |

(Continued)

(52) U.S. Cl.

CPC .............. *F21V 21/02* (2013.01); *F21S 2/005* (2013.01); *F21V 21/08* (2013.01); *F21V 21/088* (2013.01); *F21V 21/096* (2013.01); *F21V 21/30* (2013.01); *F21V 21/32* (2013.01); *F21V 33/0084* (2013.01); *F21Y 2103/10* (2016.08); *F21Y 2115/10* (2016.08)

(58) Field of Classification Search

CPC ........ F21S 2/005; B65D 51/248; F21V 21/08; F21V 21/30; F21V 21/116; F21V 21/0965

See application file for complete search history.

(56) References Cited

U.S. PATENT DOCUMENTS

| | | | |
|---|---|---|---|
| 2,541,828 | A | 2/1951 | Peck |
| 2,695,105 | A | 11/1954 | Mitchell |

(Continued)

FOREIGN PATENT DOCUMENTS

| | | | |
|---|---|---|---|
| AU | 2015101015 | B4 | 9/2015 |
| EP | 3324099 | A1 * | 5/2018 |

(Continued)

OTHER PUBLICATIONS

Machine translation of Lee et al., KR 20170104253, published Sep. 15, 2017 (Year: 2017).*

*Primary Examiner* — William N Harris

(74) *Attorney, Agent, or Firm* — Dority & Manning, P.A.

(57) ABSTRACT

Storage light assemblies are provided for modular storage systems having a plurality of commonly shaped mounting interfaces. A storage light assembly includes a light source, and a base connected to the light source, wherein the base comprises an engagement structure complementary to the commonly shaped mounting interface such that the storage light assembly can be releasably coupled to any of the plurality of commonly shaped mounting interfaces on the modular storage system.

10 Claims, 20 Drawing Sheets

(51) Int. Cl.

| | |
|---|---|
| ***F21V 21/32*** | (2006.01) |
| ***F21V 33/00*** | (2006.01) |
| *F21Y 103/10* | (2016.01) |
| *F21Y 115/10* | (2016.01) |

(56) References Cited

U.S. PATENT DOCUMENTS

| | | | | |
|---|---|---|---|---|
| 3,504,405 | A | 4/1970 | Cecily | |
| 4,119,285 | A | 10/1978 | Bisping et al. | |
| 5,359,752 | A | 11/1994 | Domenig | |
| 5,503,277 | A | 4/1996 | O'Brien | |
| 5,601,196 | A | 2/1997 | Heer et al. | |
| 5,669,515 | A | 9/1997 | Tisbo et al. | |
| 5,799,915 | A | 9/1998 | Morey | |
| 6,499,608 | B1 | 12/2002 | Sterling et al. | |
| 6,564,949 | B1 | 5/2003 | Saathoff | |
| 8,191,845 | B1 | 6/2012 | Yu | |
| 9,206,827 | B2 | 12/2015 | Loree et al. | |
| 11,006,749 | B2 | 5/2021 | Anderson et al. | |
| 2005/0269276 | A1 | 12/2005 | Pfeiffer | |
| 2006/0087833 | A1* | 4/2006 | Simoni | F21V 21/30 362/103 |
| 2007/0125731 | A1 | 6/2007 | Waterman | |
| 2008/0000853 | A1 | 1/2008 | Huang | |
| 2008/0006592 | A1 | 1/2008 | Brooks | |
| 2008/0054142 | A1 | 3/2008 | Deland | |
| 2009/0145866 | A1 | 6/2009 | Panosian et al. | |
| 2010/0102185 | A1* | 4/2010 | Jenestreet | G09F 7/18 248/218.4 |
| 2011/0062295 | A1 | 3/2011 | Totman | |
| 2011/0234072 | A1 | 9/2011 | Hightower | |
| 2012/0012726 | A1 | 1/2012 | Daniels | |
| 2013/0047386 | A1 | 2/2013 | Barfoot et al. | |
| 2014/0263119 | A1 | 9/2014 | Gruger et al. | |
| 2017/0274522 | A1 | 9/2017 | Kao | |
| 2020/0284425 | A1* | 9/2020 | Plato | F21L 2/00 |
| 2021/0310641 | A1* | 10/2021 | Grider | F21L 4/08 |
| 2022/0090768 | A1* | 3/2022 | Westling | F21L 4/04 |
| 2023/0341097 | A1* | 10/2023 | Skeren | F21V 13/12 |
| 2023/0341098 | A1* | 10/2023 | Skeren | F21V 7/0083 |

FOREIGN PATENT DOCUMENTS

| | | | | |
|---|---|---|---|---|
| KR | 20170104253 | A | * | 9/2017 |
| NO | 20160996 | A1 | * | 12/2017 |

* cited by examiner

STORAGE LIGHTS AND MOUNTING STRUCTURES FOR THE SAME

CROSS-REFERENCE TO RELATED APPLICATIONS

The present application claims priority to U.S. patent application Ser. No. 63/319,209 filed on Mar. 11, 2022, the disclosure of which is incorporated by reference herein in its entirety

FIELD

The present disclosure relates generally to storage lights, and more particularly, to storage lights that can be releasably coupled to mounting structures of modular storage systems.

BACKGROUND

Hand tools, power tools, and associated accessories such as light sources, batteries, tool bits, fasteners, and the like, may be moved frequently between a storage space and a workspace. One aspect of accessibility is a user's ability to quickly store an object and remove or relocate the object from storage. Another aspect of accessibility is the storage system's ability to engage many objects with a standardized connection mechanism between the system and the object. This may also permit an object to engage the storage system at a plurality of locations. Storage systems may also be accessible for extension or expansion.

Accordingly, improved storage systems are desired in the art. In particular, light sources and storage systems which provide an interface on internal and/or external surfaces of mounting structures to be locked together would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a storage light assembly is provided for a modular storage system having a plurality of commonly shaped mounting interfaces. The storage light assembly includes a light source, and a base connected to the light source, wherein the base comprises an engagement structure complementary to the commonly shaped mounting interface such that the storage light assembly can be releasably coupled to any of the plurality of commonly shaped mounting interfaces on the modular storage system.

In accordance with another embodiment, a modular storage system is provided. The modular storage system includes a mounting structure comprising a plurality of mounting locations each having a commonly shaped mounting interface; and a storage light comprising a light source and a base, wherein the base comprises an engagement structure complementary to the commonly shaped mounting interface such that the storage light can be releasably coupled to any of the plurality of mounting locations on the mounting structure.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1A:
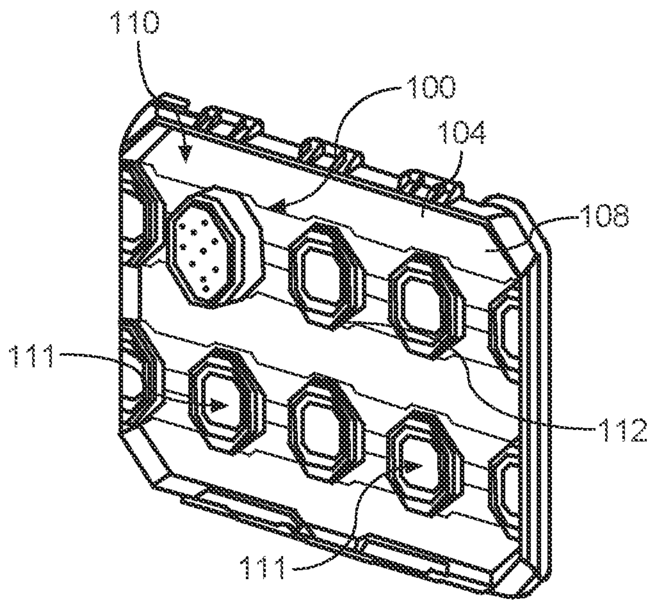
FIG. 1A is a perspective view illustrating a puck light coupled to a lid of a modular storage system in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, the present disclosure provides a storage light that can be releasably coupled to one of a plurality of mounting locations on a mounting structure as part of a collective modular storage system. The storage light and mounting structure can be provided in a variety of forms and as a variety of different types of components.

That is, a modular storage system may utilize a standardized connection design between two more mounting structures and components to facilitate universal mounting flexibility for a potentially wide variety of tools, storage systems, or other accessories. The mounting structures may include a plurality of mounting locations that each comprise ha commonly shaped mounting interface. The mounting structure can be incorporated on or in a variety of different structures. For instance, the mounting structure can be a part of a larger component (e.g., the lid or wall of a storage vessel) or may be a standalone component (e.g., a wall or a wall-mountable rail or platform). One or more components can comprise a recessed mounting structure that is complementary to the commonly shaped mounting interface of the mounting structure's mounting locations. As such, the one or more components can be independently releasably coupled to any of the plurality of mounting locations to provide storage and accessibility flexibility for a user.

The mountable components can include, for example, storage lights. As such, the storage lights can be releasably coupled to the mounting structure for operation (e.g., to illuminate a workspace while releasably coupled to the mounting structure) and/or for storage between projects. The storage lights can also be provided in a variety of different components to provide design flexibility and/or tailored performance features. For instance, the storage lights may be incorporated into bodies having different sizes, shapes, positional maneuverability (e.g., rotatable about one or more axis), or mounting mechanics for releasably coupling to the commonly shaped mounting interface. Likewise, the storage lights may comprise different types or amounts of light sources, potentially including on board power supplies or additional control features. Further, the storage lights may be a standalone components, or may be integrated with other types of components such as power strips.

These storage lights and mounting structures are disclosed and described herein with respective to a variety of different forms, types, and configurations. It should be appreciated that while various embodiments of these components, and overall modular storage systems, and illustrated and described herein with respect to certain examples, these configurations are not intended to be limiting or mutually exclusive. That is, additional configurations of the storage lights and mounting structures, including additional combinations, may also be realized without deviating from the scope of this disclosure.

Figure 1B:
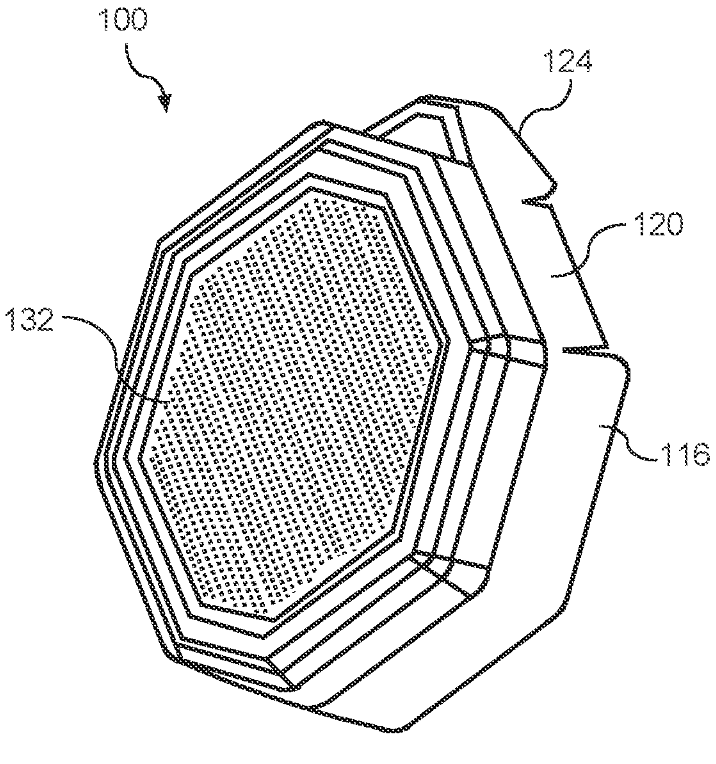
FIG. 1B is a perspective view of the puck light of FIG. 1A in accordance with embodiments of the present disclosure.

Referring now to the drawings, FIG. 1A illustrates a storage light assembly in the form of a puck light 100 that is releasably coupled to a modular storage system 104. FIG. 1B illustrates a perspective view of the puck light of FIG. 1A. As illustrated in FIG. 1A, the modular storage system 104 comprises a lid 108 for a bin or container (not shown). However, the modular storage system 104 may comprise one or more other configurations, such as a horizontal or vertical elongated rail that can be mounted onto a wall.

The lid 108 has a mounting structure 110 that comprises a plurality of mounting locations 111. As illustrated, the plurality of mounting locations 111 are evenly distributed in a grid like pattern. However, the plurality of mounting locations 111 may also be distributed in any other configuration suitable for releasably connecting one or more components thereto. For instance, the plurality of mounting locations 111 may be distributed along a linear array, may be distributed in a different two-dimensional array, or may be distributed about a contoured surface such that one or more of the mounting locations 111 are on different planes.

Each of the plurality of mounting locations 111 comprises a commonly shaped mounting interface 112 (e.g., cleats). That is, each of the commonly shaped mounting interfaces 112 can be configured as the same universal size and shape. Thus, one or more components can be releasably connected to the mounting locations 111 via a standardized connection. This can provide greater flexibility in the ability to store, access, or mount a variety of tools and accessories.

The puck light 100 has a base 116 that can be releasably coupled to the interface 112. The base 116 has a recessed mounting structure that is complementary to the interface 112 to facilitate engagement and disengagement of the puck light 100 relative to the interface 112. In some embodiments, the engagement structure can be substantially the same size as the commonly shaped mounting interface 112. For instance, the puck light 100 (or other type of storage light) can be releasably coupled to the mounting structure 110 by a friction fit between the engagement structure on the puck light 100 and the commonly shaped mounting interface 112 on the mounting structure 110.

In some examples, the base 116 of the puck light 100 can comprise a size that is substantially similar to the commonly shaped mounting interface 112. In other embodiments, the base 116 of the puck light 100 (or other type of storage light) can comprise a size that is longer in at least one dimension than the commonly shaped mounting interface 112. For instance, the puck light 100 may be able to envelope the commonly shaped mounting interface 112 and be left to hang thereon, such as by a bracket that engages the commonly shaped mounting interface 112.

As shown, the base 116 of the puck light 100 includes a clip or detent feature 120 that resists removal of the base 116 from the interface 112 absent a sufficient force. The base 116 also has a loop feature 124 that allows the puck light 100 to be hung or suspended (e.g., via a rope or zip-tie) separate from attachment to the modular storage system 104. However, while the puck light 100 is illustrated with the clip or detent feature 120 and the loop feature 124, it should be appreciated that puck lights 100 may also be provided without one or more of these features, or with further features additionally or alternatively included, without deviating from the scope of this disclosure.

With reference to FIG. 1B, the puck light 100 includes a light source illustrated as light emitting diodes (LEDs) 128. The light source may alternatively or additionally include any other light source, such as an incandescent or compact fluorescent light source. The puck light 100 further includes and a lens 132. In some embodiments, the lens 132 may be depressible to change a power state (e.g., on vs. off or a brightness level) of the LEDs 128 the puck light 100. Moreover, as shown, the lens 132 has a textured surface to diffuse light from the LEDs 128. However, the lens 132 may alternatively or additionally include one or more other features such as other diffusing or diffraction patterns.

Figure 2A:
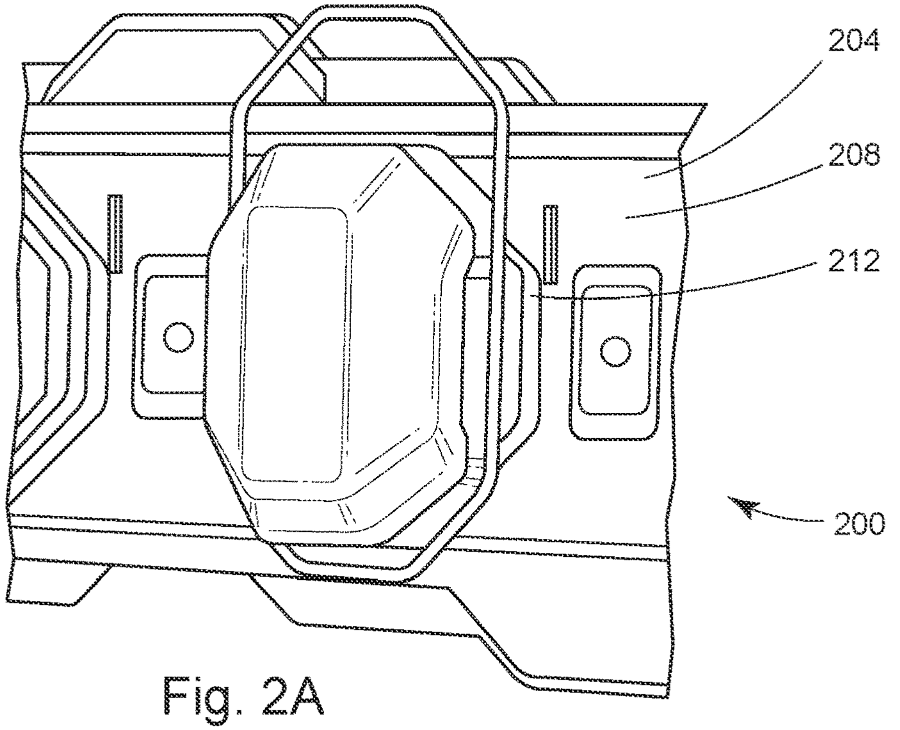
FIG. 2A is a perspective view illustrating a lantern coupled to a rail of a modular storage system in accordance with embodiments of the present disclosure.
Figure 2B:
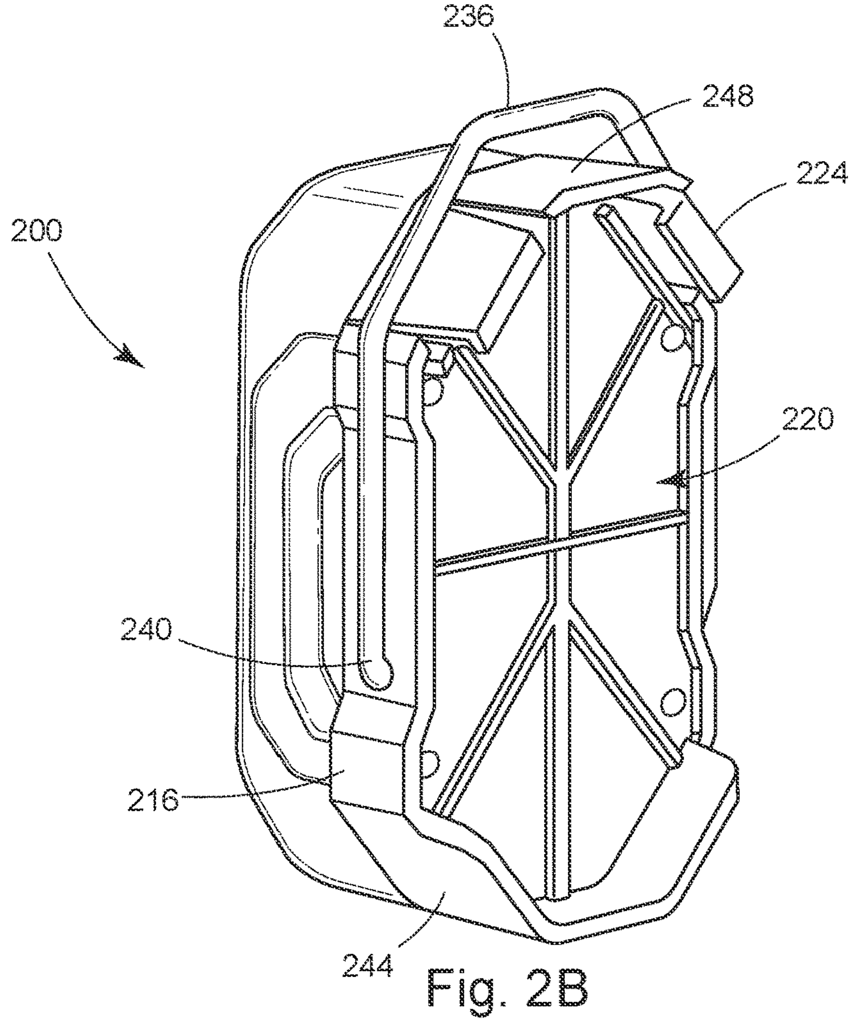
FIG. 2B is a perspective view illustrating the lantern of FIG. 2A in accordance with embodiments of the present disclosure.
Figure 2C:
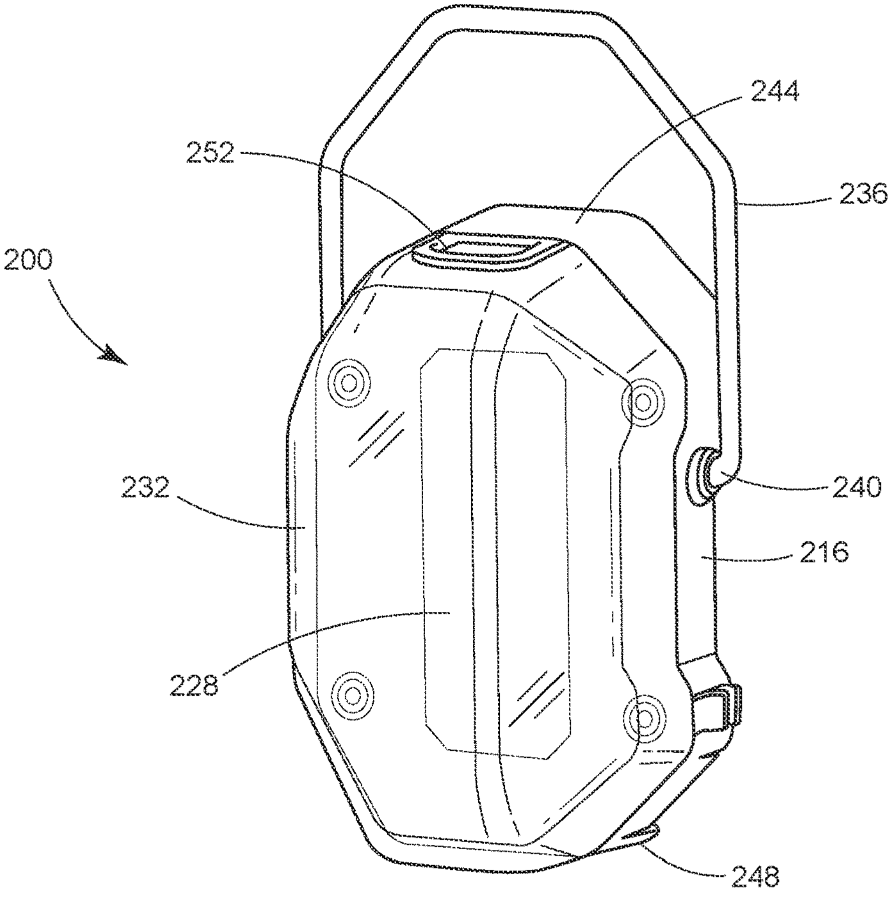
FIG. 2C is a perspective view illustrating the lantern of FIG. 2A in accordance with embodiments of the present disclosure.

With reference to FIGS. 2A-2C, another embodiment of a storage light is illustrated including a lantern 200 that is coupled to a modular storage system 204. As shown FIG. 2A, the modular storage system 204 is a horizontal rail 208 that may be coupled to a wall or other surface. Similar to the modular storage system 104 illustrated in FIG. 1A, the rail 208 of the modular storage system in FIG. 2A includes a commonly shaped mounting interface 212. In some embodiments, the commonly shaped mounting interface 212 may comprise the same configuration as the commonly shaped mounting interface 112 from the lid 108 in FIG. 1, such that both elements can similarly receive a variety of components using the same standard mounting configuration.

As best illustrated in FIGS. 2B and 2C, the lantern 200 has a base 216 that is attachable to the commonly shaped mounting interface 212 of FIG. 2A. As illustrated, the base 216 defines an engagement feature such as a recess or pocket 220 that complements the interface 212. In some embodiments, the engagement feature of the base 216 may additionally or alternatively comprise a protrusion. Moreover, as shown in FIG. 2B, when the base 216 is attached to the interface 212, a clip or detent feature 224 on the base 216 resists removal of the base 216 from the interface 212 absent a sufficient force.

The lantern 200 also includes an LED board 228 as a light source. A lens 232 has a dome shape and is coupled to the base 216 to enclose the LED board 228. A wire handle 236 is pivotally coupled to the base 216 at pivot points 240. The wire handle 236 allows the lantern 200 to be hung or suspended (e.g., via a rope or hanger) separate from attachment to the modular storage system 204. The wire handle 236 is pivotable forward (over the lens 232) or backward more than 90 degrees from the orientation shown in FIG. 2C. As shown, the pivot points 240 are positioned closer to a first end 244 than to a second end 248 relative to the longitudinal length of the base 216. As shown in FIGS. 2A and 2B, the wire handle 236 is positioned at the second end 248 and is spaced relatively close to the base 216 to provide compact storage of the lantern 200 when the lantern 200 is coupled to the modular storage system 204. As shown in FIG. 2C, the wire handle 236 is positioned at the first end 244 and defines a gap or space relative to the base 216. The space between the wire handle 236 and the first end 244 is larger than the space between the wire handle 236 and the second end 248 to facilitate hanging or suspending the lantern 200. As illustrated, the lantern 200 also includes a button 252 disposed at the first end 244 to change the power state of the lantern 200, such as turning it on or off.

Figure 2D:
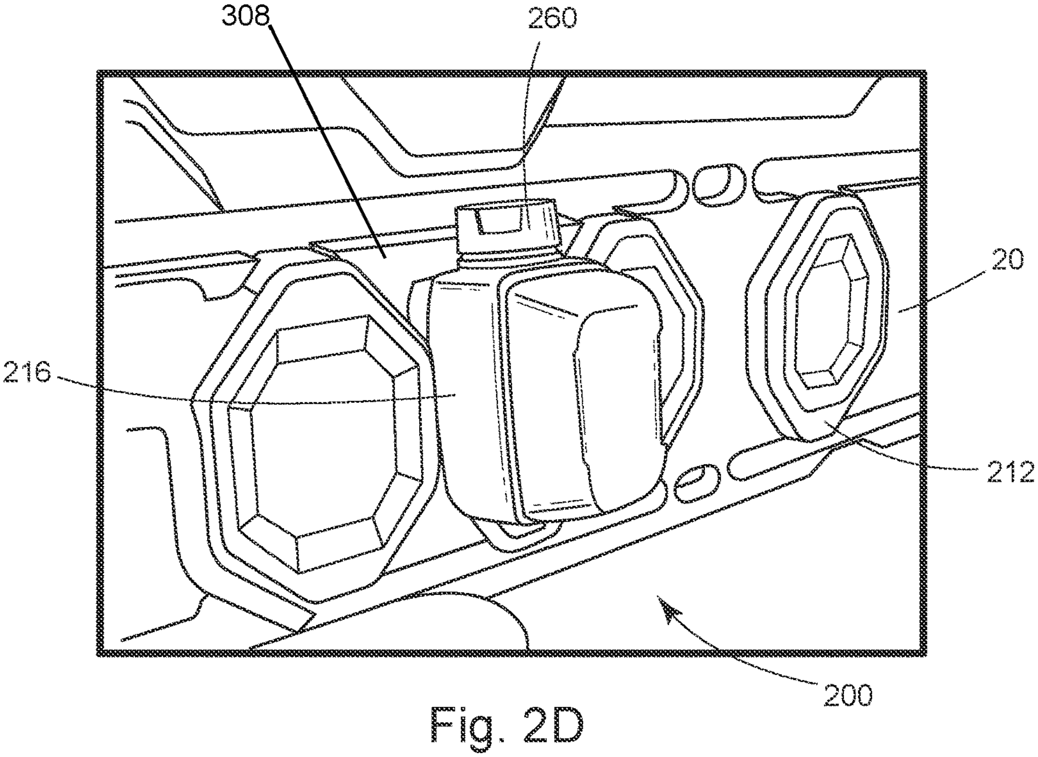
FIG. 2D is perspective view of another lantern in a mounted position in accordance with embodiments of the present disclosure.
Figure 2E:
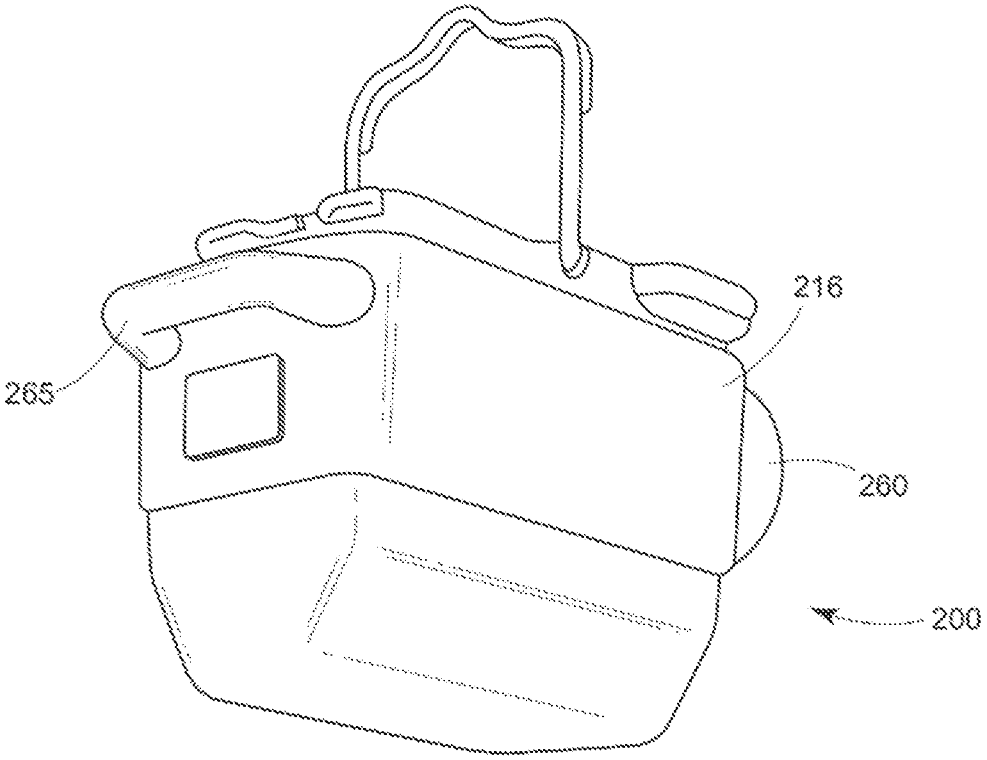
FIG. 2E is a perspective view illustrating the lantern of FIG. 2D in a hanging position in accordance with embodiments of the present disclosure.

With reference to FIGS. 2D and 2E, another embodiment of a storage light is illustrated including a lantern 200' that is coupled to a modular storage system 204. The lantern 200' can be releasably coupled to the same modular storage system 204 (e.g., horizontal rail 208) that may be coupled to a wall or other surface. However, the lantern 200' illustrated in FIGS. 2D and 2E can be supported through friction and recesses under the interfaces 212, without the need for a detent feature (224 in FIG. 2B). Moreover, the wire handle 236' is pivotally connected to the base 216' at a center location. Such embodiments can allow for illumination directly under the area from which the lantern 200' is hung, such as illustrated in FIG. 2B. Moreover, the lantern 200' includes a button 260 to control a power state or other feature of the lantern 200 (e.g., brightness) and a lanyard loop 265 extending from the base 216'.

Figure 3A:
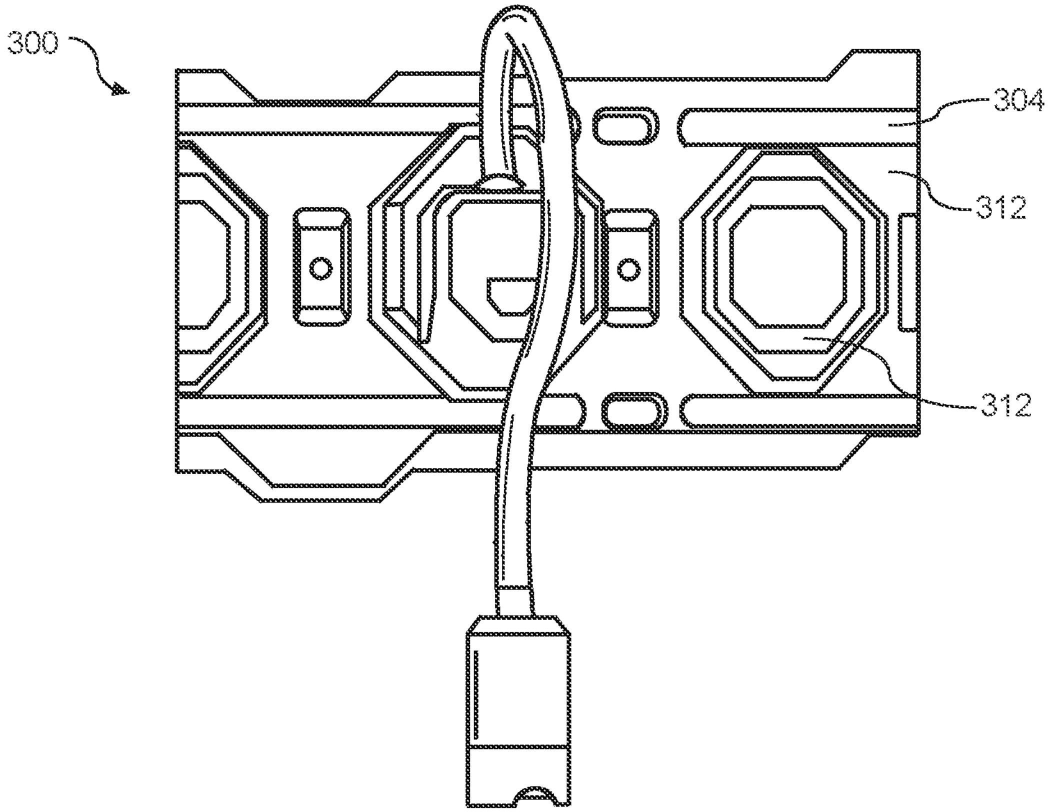
FIG. 3A is a perspective view illustrating a snake light coupled to a rail of a modular storage system in accordance with embodiments of the present disclosure.
Figure 3B:
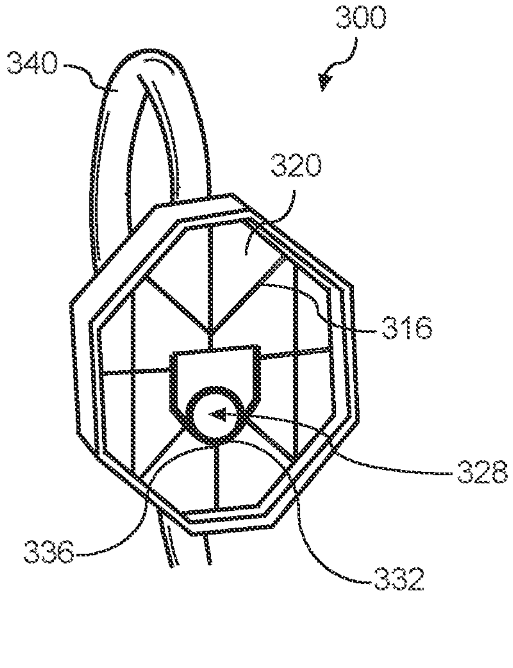
FIG. 3B is a perspective view illustrating the snake light of FIG. 3A in accordance with embodiments of the present disclosure.
Figure 3C:
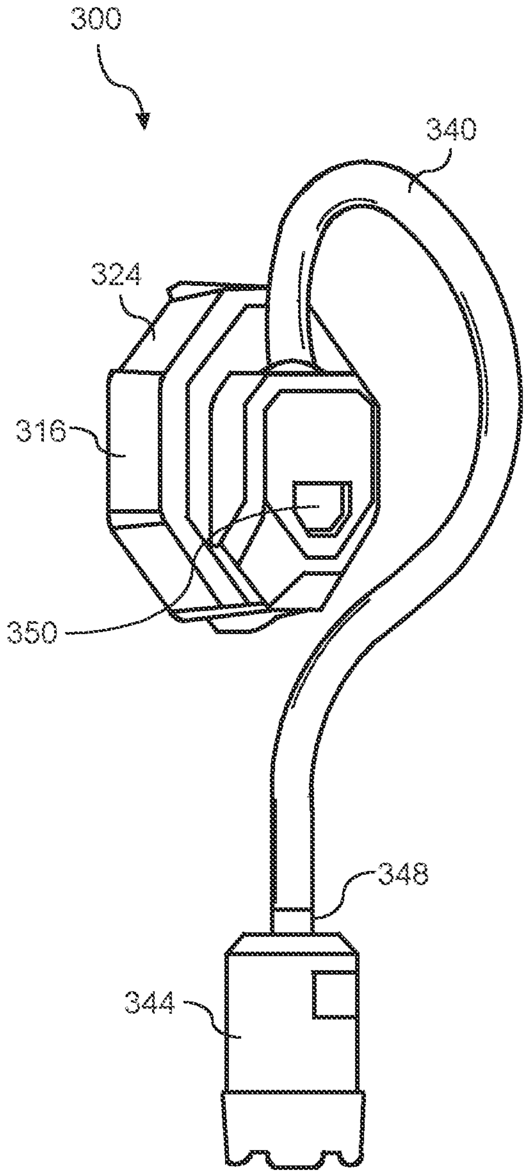
FIG. 3C is a perspective view illustrating the snake light of FIG. 3A in accordance with embodiments of the present disclosure.

With reference to FIGS. 3A-3C another embodiment of a storage light is illustrated including a snake light 300 that is coupled to a modular storage system 204. As illustrated in FIG. 3A, the modular storage system 304 includes a rail 308 that has a commonly shaped mounting interface 312. The rail 308 may be coupled to, for example, a wall or other surface.

With reference to FIG. 3B, the snake light 300 includes a base 316 that is attachable to the commonly shaped mounting interface 312. For instance, the base 316 can comprise a recess 320 corresponding to the shape of the commonly shaped mounting interface 312. When the base 316 is attached to the commonly shaped mounting interface 312 (FIG. 3A), a clip or detent feature 324 on the base 316 can resist removal of the base 316 from the interface 312 absent application of a sufficient force.

With continued reference to FIG. 3B, the base 316 includes an indent or pocket 328 that is disposed in a surface of the recess 320, and a loop 332 that is pivotally coupled to the base 316 adjacent the pocket 328. The loop 332 allows the snake light 300 to be hung or suspended separate from attachment to the modular storage system 304. The loop 332 engages a snap 336 on the base 316 that maintains flush storage of the loop 332 when not in use. The pocket 328 provides space for a user's finger so that the loop 332 may be pulled out from the snap 336.

With reference to FIG. 3C, the light source (e.g., light head 344) is separated from the base 316 via a flexible neck 340. That is, the light head 344 is coupled to a distal end 348 of the flexible neck 340 to allow the light head 344 to be repositionable at a variety of locations away from the base 316. The base 316 also includes a switch 350 to turn the snake light 300 on or off. Alternatively, or additionally, a switch 350 may by disposed on the light head 344.

Figure 3D:
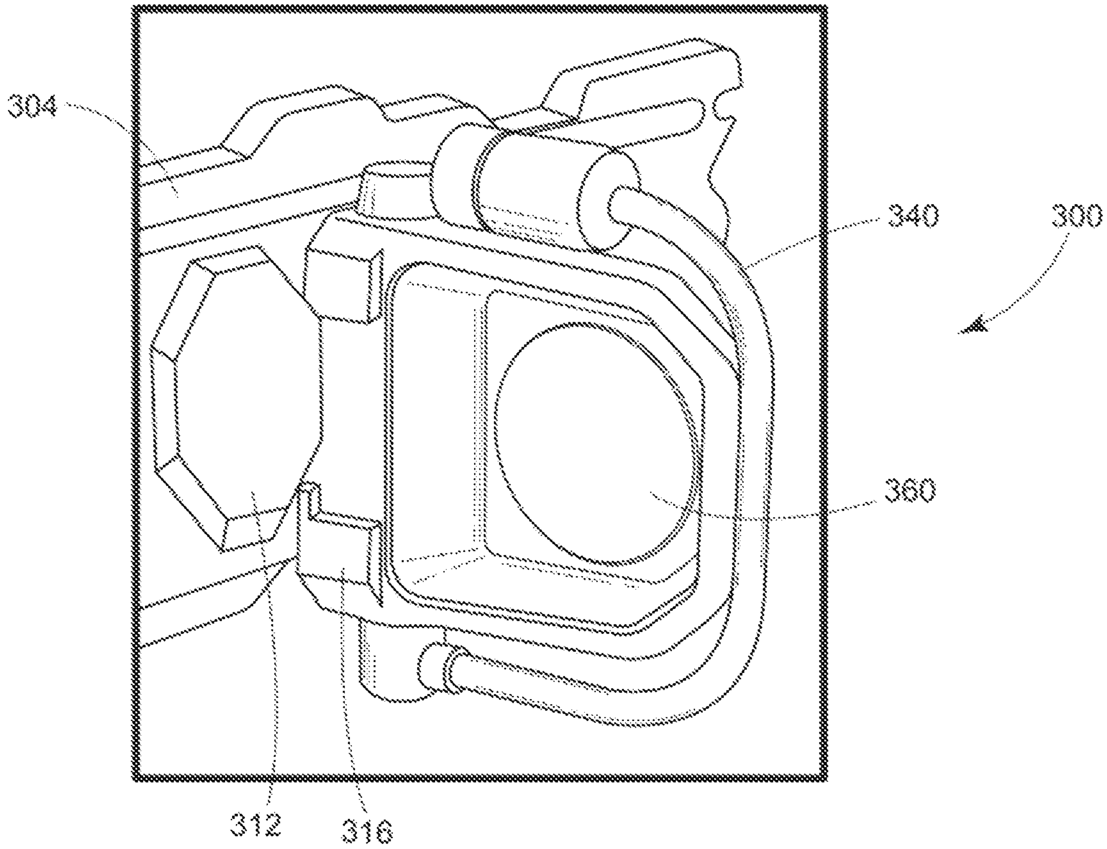
FIG. 3D is a perspective view of another snake light mounted in a vertical position in accordance with embodiments of the present disclosure.
Figure 3E:
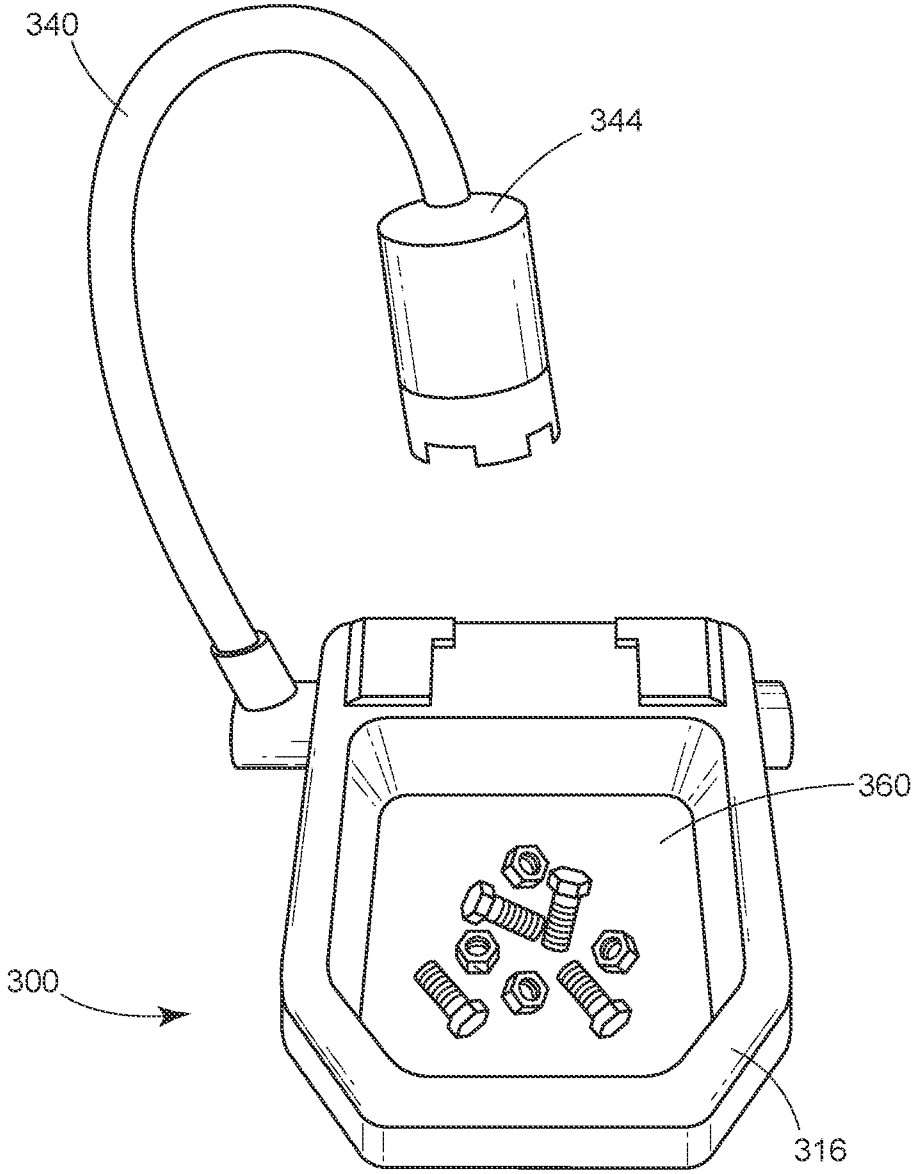
FIG. 3E is a perspective view of illustrating the snake light of FIG. 3D mounted in a horizontal position in accordance with embodiments of the present disclosure.
Figure 3F:
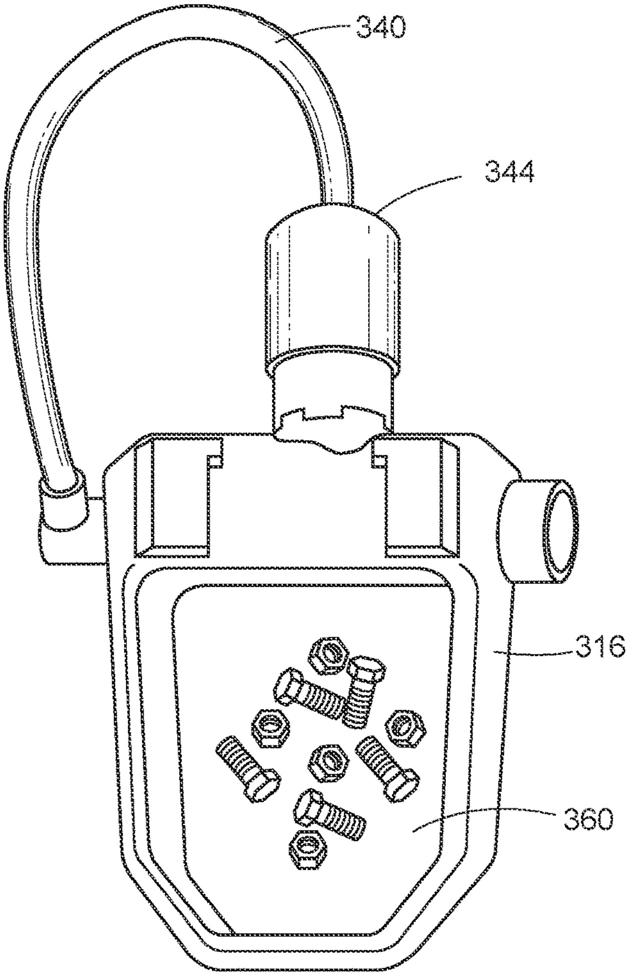
FIG. 3F is a perspective view of illustrating the snake light of FIG. 3D in a magnetically mounted position in accordance with embodiments of the present disclosure.

With reference to FIGS. 3D-3F, another embodiment of a storage light is illustrated including a snake light 300' that is couplable to a modular storage system 304 or other surfaces. Compared to the snake light 300 illustrated in FIGS. 3A-3C, the snake light 300' illustrated in FIGS. 3D-3F includes a base 316' that includes a tray 360, such as for holding or storing one or more objects (e.g., screws or the like). In some embodiments, the tray 360 may be magnetic. The light head 344' of the snake light 300' can still be connected to the flexible neck 340', but the flexible neck 340' may extend from any suitable location about the tray 260, such as a base of the tray as illustrated. Moreover, the flexible neck 340' may be rotatably connected to the tray 360 as illustrated.

The snake light 300' may also be releasably couplable, including to the modular storage system 304, in multiple configurations. For instance, the snake light 300' may be mountable in a vertical configuration as illustrated in FIG. 3D, such as by interlocking between two adjacent interfaces 312. The snake light 300' may also be mountable in a horizontal configuration as illustrated in FIG. 3E, such as by engaging with and resting on one or more of the interfaces 312. In even some embodiments, the base 316' of the snake light 300' may include one or more magnets, such that the snake light 300' can be magnetically attachable to a ferrous surface, such as illustrated in FIG. 3F.

Figure 4A:
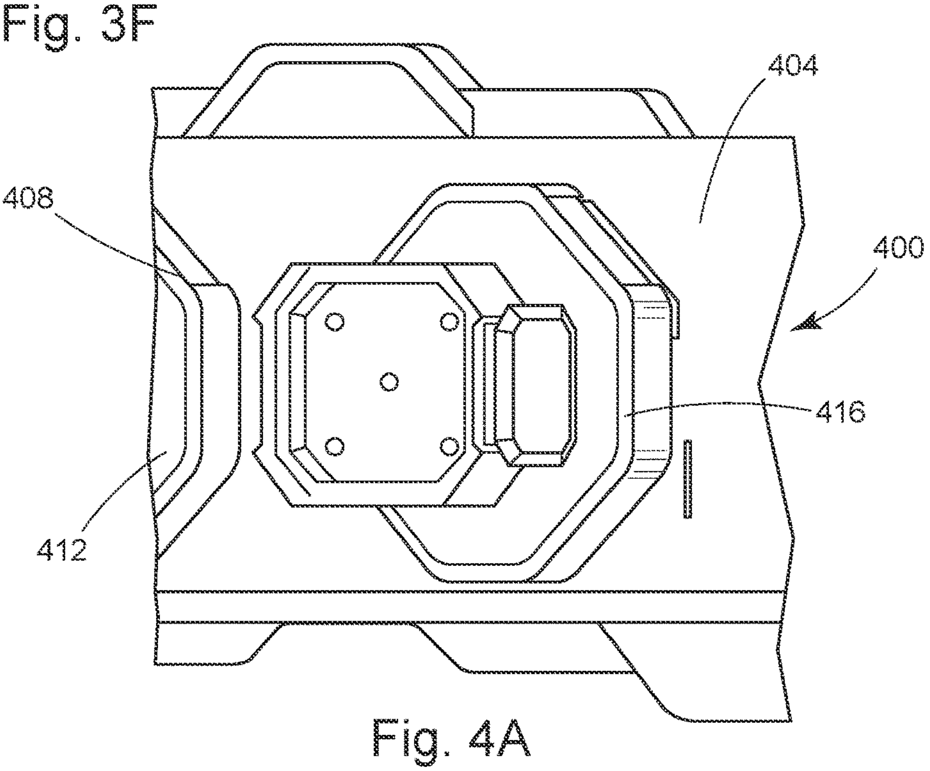
FIG. 4A is a perspective view illustrating a spotlight coupled to a rail of a modular storage system in accordance with embodiments of the present disclosure.
Figure 4B:
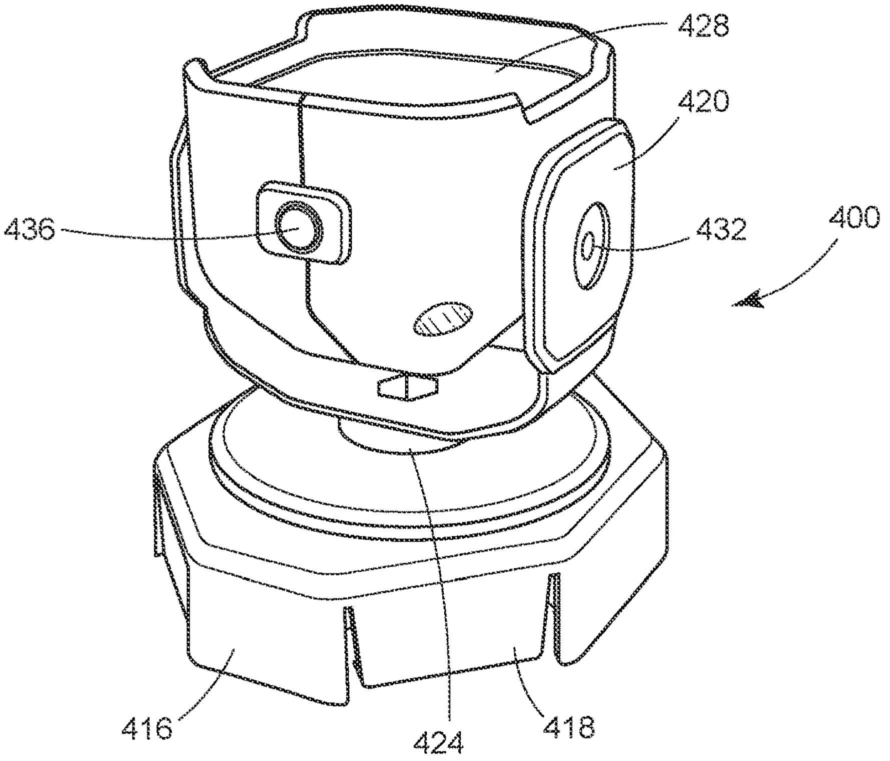
FIG. 4B is a perspective view illustrating the spotlight of FIG. 4A in accordance with embodiments of the present disclosure.

With reference to FIGS. 4A and 4B, another embodiment of a storage light is illustrated including a spotlight 400 that is coupled to a modular storage system 404. The modular storage system 404 includes a rail 408 that has a commonly shaped mounting interface 412. The rail 408 may be coupled to, for example, a wall or other surface. As best shown in FIG. 4B, the spotlight 400 includes a base 416 that is attachable to the commonly shaped mounting interface 412, such as by base 416 having a recess (not shown) that complements the interface 412 for attachment of the base 416 to the commonly shaped mounting interface 412. When the base 416 is attached to the commonly shaped mounting interface 412 (FIG. 4A), a clip or detent feature 418 on the base 416 can engage the commonly shaped mounting interface 412 and resist removal of the spotlight 400 from the rail 408 absent a sufficient force.

The base 416 provides support for the spotlight 400 to stand or rest on a surface independent of the modular storage system 404. Moreover, the spotlight 400 (or other light source) can be pivotably connected to the base 416, either through a direct or indirect connection. For instance, with reference to FIG. 4B, a yoke 420 is pivotally coupled to the base 416 at a first pivot 424 and an O-ring (not shown) is disposed in the base 416 and frictionally engages the yoke 420 to inhibit free-spinning of the yoke 420 relative to the base 416 absent an external force (e.g., applied by a user) on the yoke 420. A light head 428 is pivotally coupled to the yoke 420 at a second pivot 432 (shown as opposite pivots 432, with one pivot 432 shown). The yoke 420 is pivotable relative to the base 416 and the light head 428 is pivotable relative to the yoke 420 through 360 degrees. The light head 428 can support the electronic components of the spotlight 400, including a switch 436 that turns the light head 428 on and off. The pivotal connection provided by the yoke 420 can allow for a sound structural connection between the base 416 and the light head 428 while still allowing for multiple axes of rotation for positional flexibility in the direction of light provided by the light head 428.

Figure 4C:
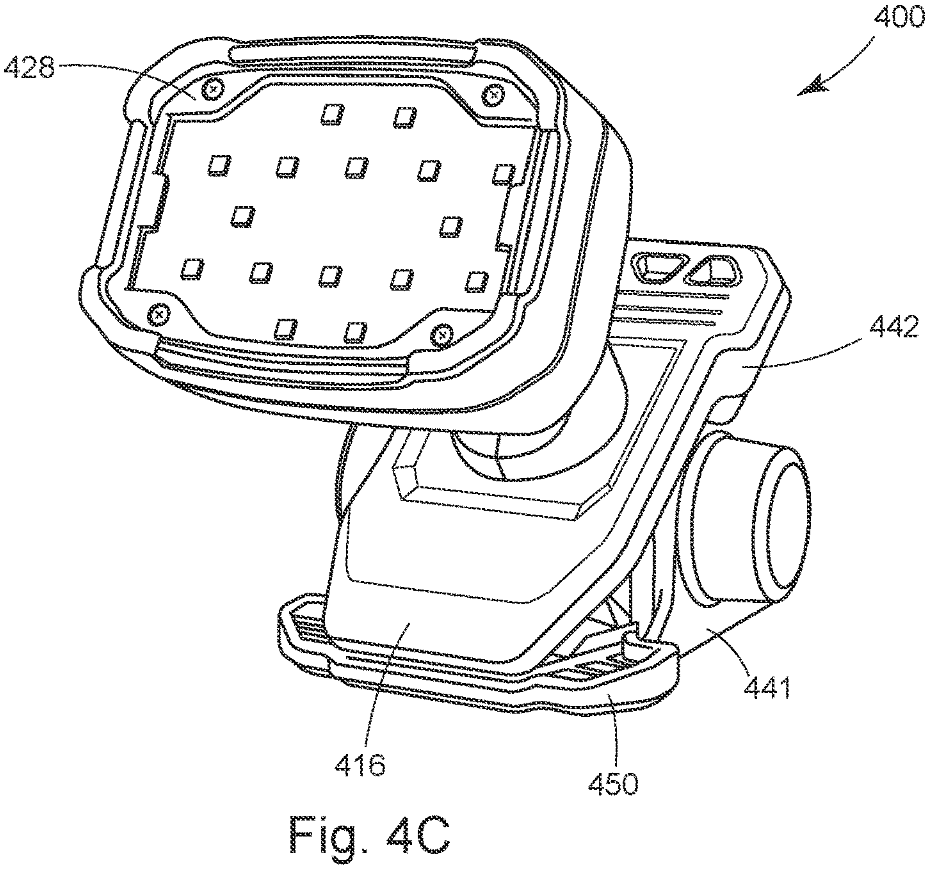
FIG. 4C is a perspective view illustrating a clamp light in accordance with embodiments of the present disclosure.
Figure 4D:
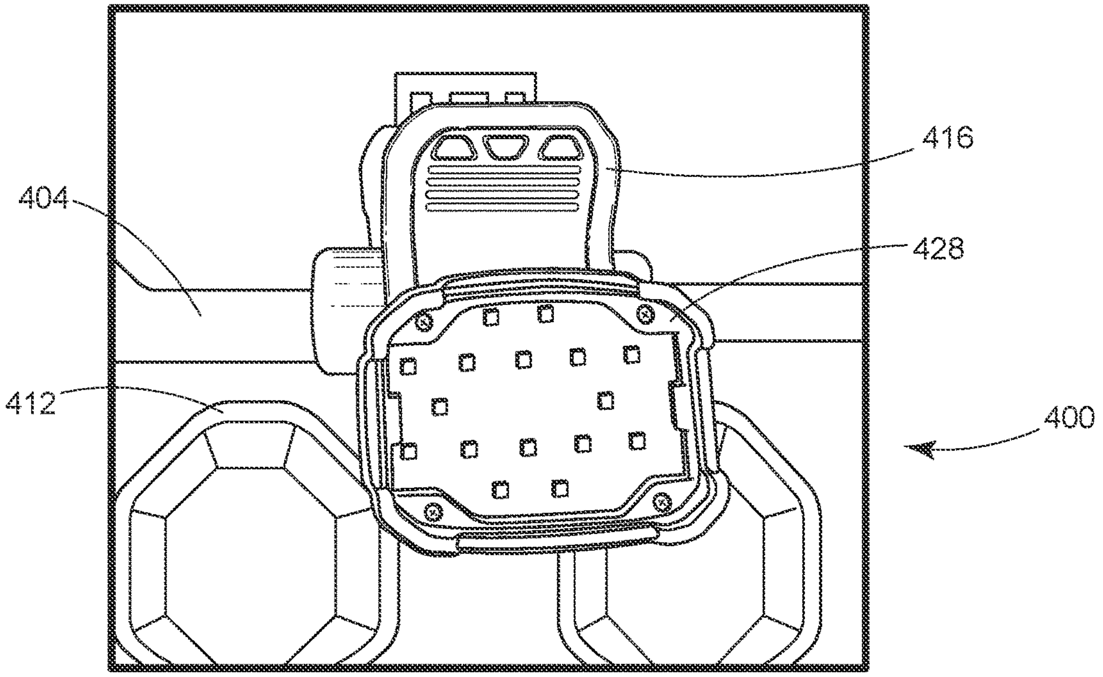
FIG. 4D is a front view illustrating the clamp light of FIG. 4C mounted onto a modular storage system in accordance with embodiments of the present disclosure.
Figure 4E:
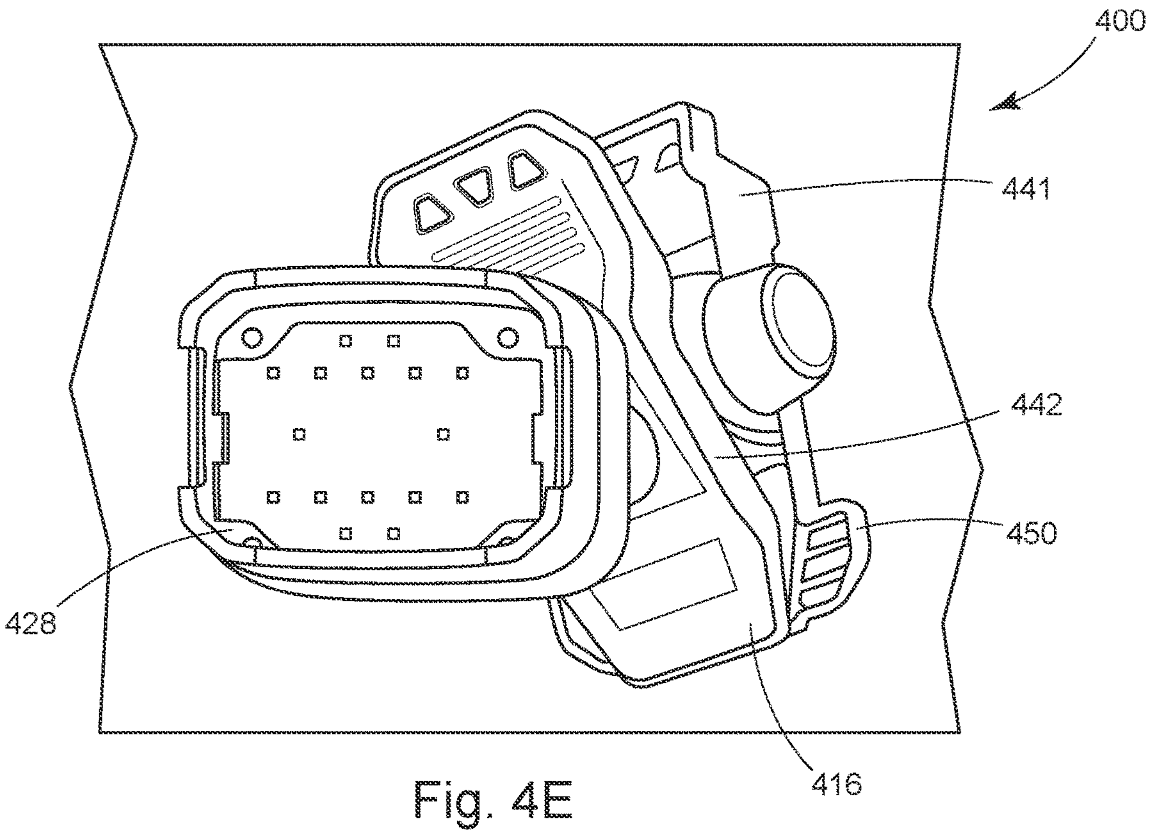
FIG. 4E is a perspective illustrating the clamp light of FIG. 4C in a magnetically mounted position in accordance with embodiments of the present disclosure.

With reference to FIGS. 4C-4E, another embodiment of a storage light is illustrated including a clamp light 400' that is couplable to the modular storage system 404 or other surfaces. The clamp light 400' includes a light head 428' that can be connected, or pivotally connected, to a base 416'. However, the base 416' can comprise a clip configuration. For instance, the base 416' can include a first portion 441 and a second portion 442 that are connected to one another via a hinge (e.g., spring) that imposes a biasing force that pushes the first portion 441 and the second portion 442 into a closed position.

The light head 428' can be connected to one of the two portions, such as the second portion 442 as illustrated. The first portion 441 may comprise an engagement structure 450 that is configured to mate with the interfaces 412 of the modular storage system 404. As such, the clamp light 400' may be mountable to the modular storage system 404 in a variety of configurations. For instance, the clamp light 400' may be clampable to an edge of the modular storage system 404, or may be releasably connectable to the interfaces 412 via the engagement structure 450. In even some embodiments, the first portion 441 of the clamp light 400' may include one or more magnets, such that the clamp light 400' can be magnetically attachable to a ferrous surface, such as illustrated in FIG. 4E.

Figure 5A:
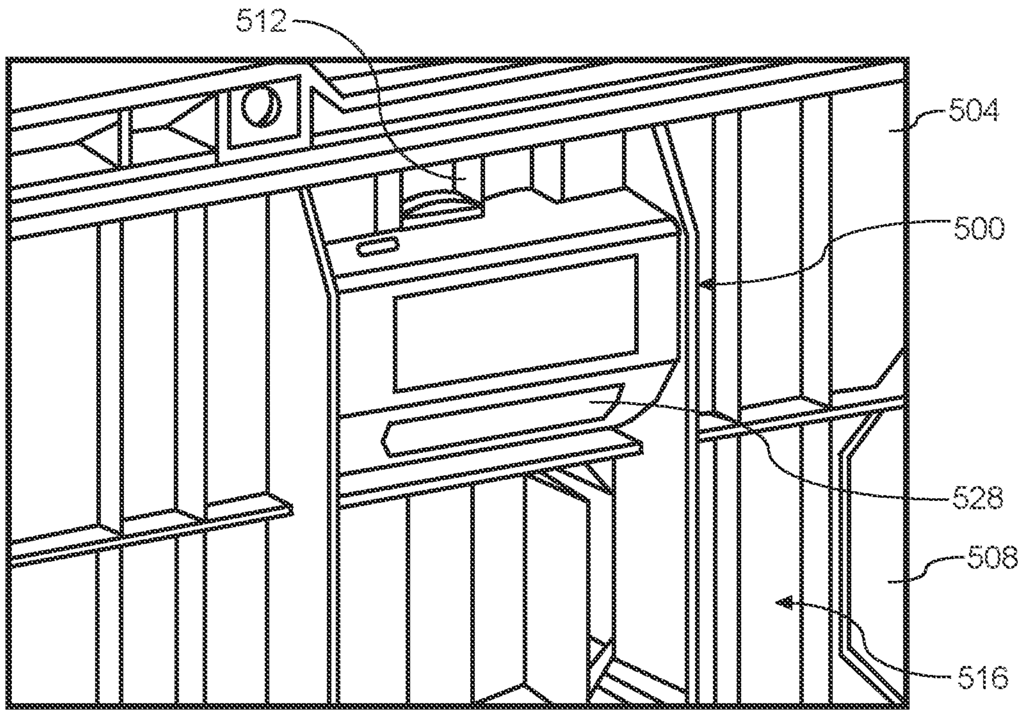
FIG. 5A is a perspective view of a box light coupled to a lid of a big of a modular storage system in accordance with embodiments of the present disclosure.
Figure 5B:
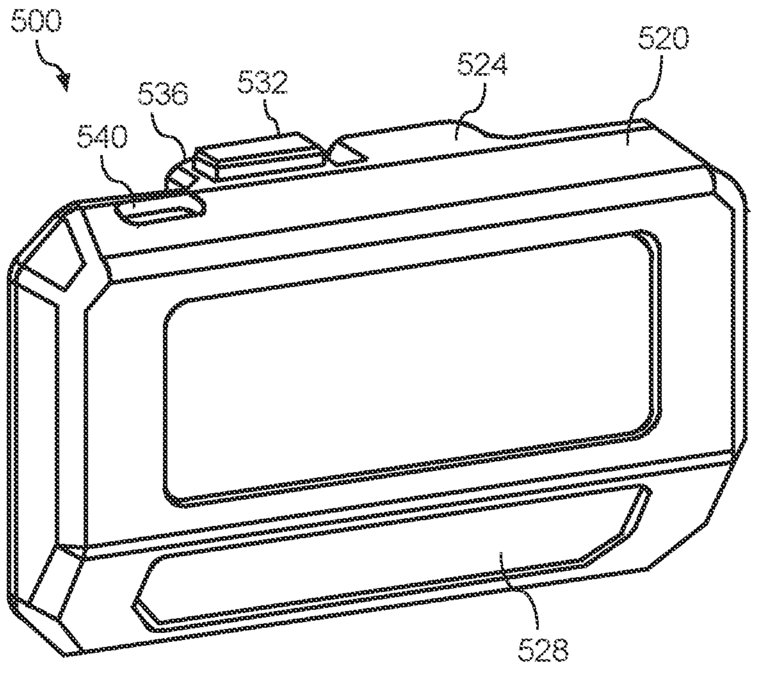
FIG. 5B is a perspective view of the box light of FIG. 5A in accordance with embodiments of the present disclosure.

With reference to FIGS. 5A and 5B another embodiment of a storage light is illustrated including a box light 500 coupled to a modular storage system 504. As shown in FIG. 5A, the modular storage system 504 includes a lid 508, such as of a bin or container or storage case (not shown). However, while the modular storage system 504 is illustrated as including the lid 508, any other suitable component may alternatively or additionally make up the modular storage system 504, such as a wall or platform.

As illustrated, the lid 508 has one or more ribs 512 at an interior side 516 of the lid 508 for a commonly shaped mounting interface. The box light 500 includes a housing 520 that has a channel 524 as its engagement structure that is engageable by one of the ribs 512. For instance, the box light 500 may have an interference or frictional fit to resist removal of the box light 500 from the lid 508 absent a sufficient force. The frictional fit refers to the two elements having a similar form factor such that they are supported by one another via friction when engaged. Alternatively, or additionally, the channel may be engageable with the plurality of ribs via an interference fit, wherein the two elements mechanically interact with one another when engaged.

As shown in FIG. 5B, the box light 500 includes a light source and a lens 528 that is oriented so that the light source shines light into the container when the lid 508 is opened (e.g., when the storage case is placed on a horizontal surface and the lid 508 is open, the illustrated lens 528 is angled outward and downward—as indicated by the arrow in FIG. 5A—relative to the lid 508 adjacent a bottom of the box light 500). The housing 520 includes a switch 532 to turn the box light 500 on and off. A tilt switch 536 is disposed inside the housing 520 and turns the box light 500 on when the lid 508 is opened, and turns the box light 500 off when the lid 508 is closed. In addition, the illustrated box light 500 has a charger port 540 (e.g., a USB-C port) to facilitate charging the box light 500.

Figure 6A:
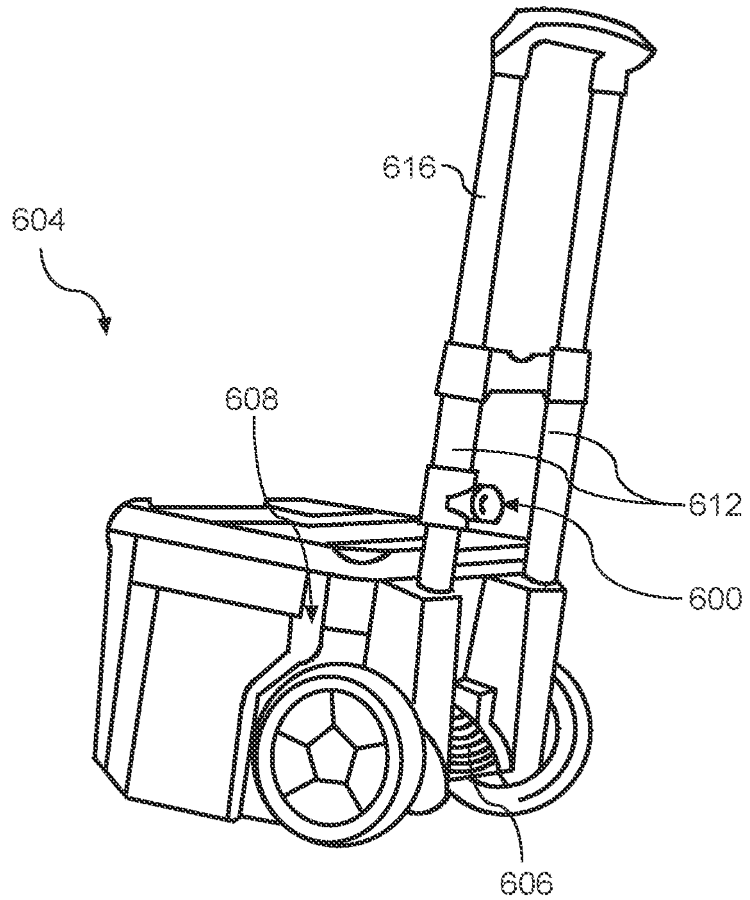
FIG. 6A is a perspective view of a roller-mount light according to the present invention and coupled to an integrated roller bin in accordance with embodiments of the present disclosure.
Figure 6B:
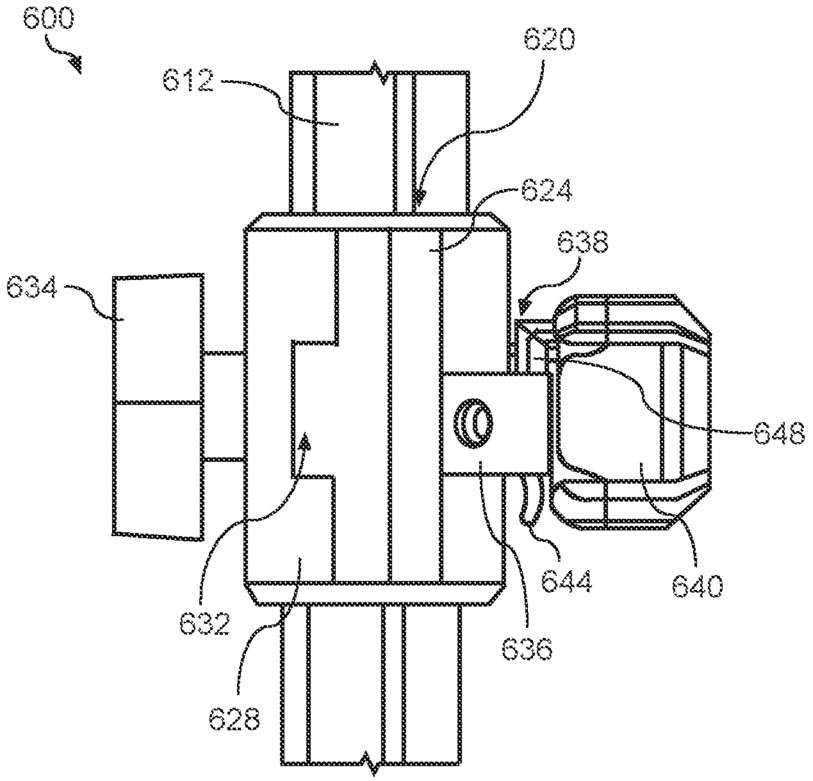
FIG. 6B is a side view of the roller-mount light coupled to the integrated roller bin of FIG. 6A in accordance with embodiments of the present disclosure.
Figure 6C:
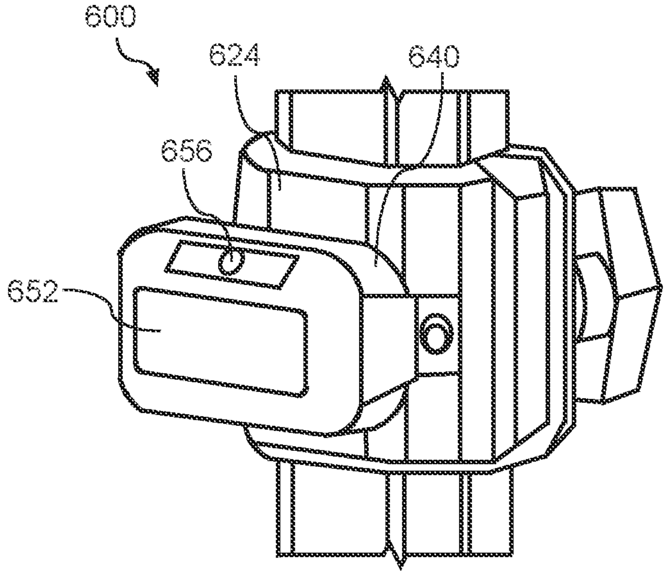
FIG. 6C is another perspective view of the roller-mount light coupled to the integrated roller bin of FIG. 6A in accordance with embodiments of the present disclosure.

With reference to FIGS. 6A-6C another embodiment of a storage light is illustrated including a roller-mount light 600 that is coupled to a modular storage system 604. As shown in FIG. 6A, the modular storage system 604 is part of a roller-tote that includes a cart 606 with an integral bin 608 that has a pair of tubes 612 forming a handle 616. The pair of tubes 612 can comprise any elongated shaft to serve as a mounting structure for releasably coupling with a storage light.

For instance, as illustrated, a light mount 620 includes a first mount piece 624 and a second mount piece 628 that are hinged together other at a hinge 632 to define a recessed engagement structure that is complementary (i.e., configured to receive) the elongated shaft. Thus, the first mount piece 624 and the second mount piece 628 can releasably couple the light mount 620 to one of the tubes 612. A fastener 634 can further be included to tighten the light mount 620 onto the tube 612. A metal bar 636 (e.g., in the form of a flexible clip) extends from the light mount 620 and defines a gap 638 relative to the light mount 620.

With reference to FIGS. 6B and 6C, the roller-mount light 600 includes a housing 640 and a clip feature 644 that is coupled to or formed on a backside of the roller-mount light 600 and that attaches the housing 640 to the metal bar 636. More specifically, the clip feature 644 fits over the metal bar 636 into the gap 638 and engages the metal bar 636 to couple the roller-mount light 600 to the light mount 620. One or more magnets 648 magnet are disposed in or coupled to the clip feature 644 to facilitate a stronger attachment of the housing 640 to the metal bar 636. The clip feature 644 is removable from the modular storage system 604 and may separately or independently engage any object with a clip like the metal bar 636 (e.g., a belt clip, a hat clip, etc.). The light source has LEDs (e.g., a LED board; not shown) and a lens 652 that is disposed over the LED board on a side of the roller-mount light 600 opposite the clip feature 644. The housing 640 supports the electronics of the roller-mount light 600 as well as a switch 656 adjacent the lens 652. The switch 656 turns the roller-mount light 600 on and off. The housing 640 also supports disposable batteries (e.g., AAA batteries) that provide a power source for the roller-mount light 600. The roller-mount light 600 may instead or additionally include a rechargeable battery as a power source.

Any of the above-described embodiments of the storage lights may include a disposable battery or a rechargeable battery as a power source for the storage light. For embodiments with a rechargeable battery the storage light may have a USB port (e.g., a USB-C port) to which a power cord is coupled to provide a power supply for recharging the rechargeable battery.

Figure 7A:
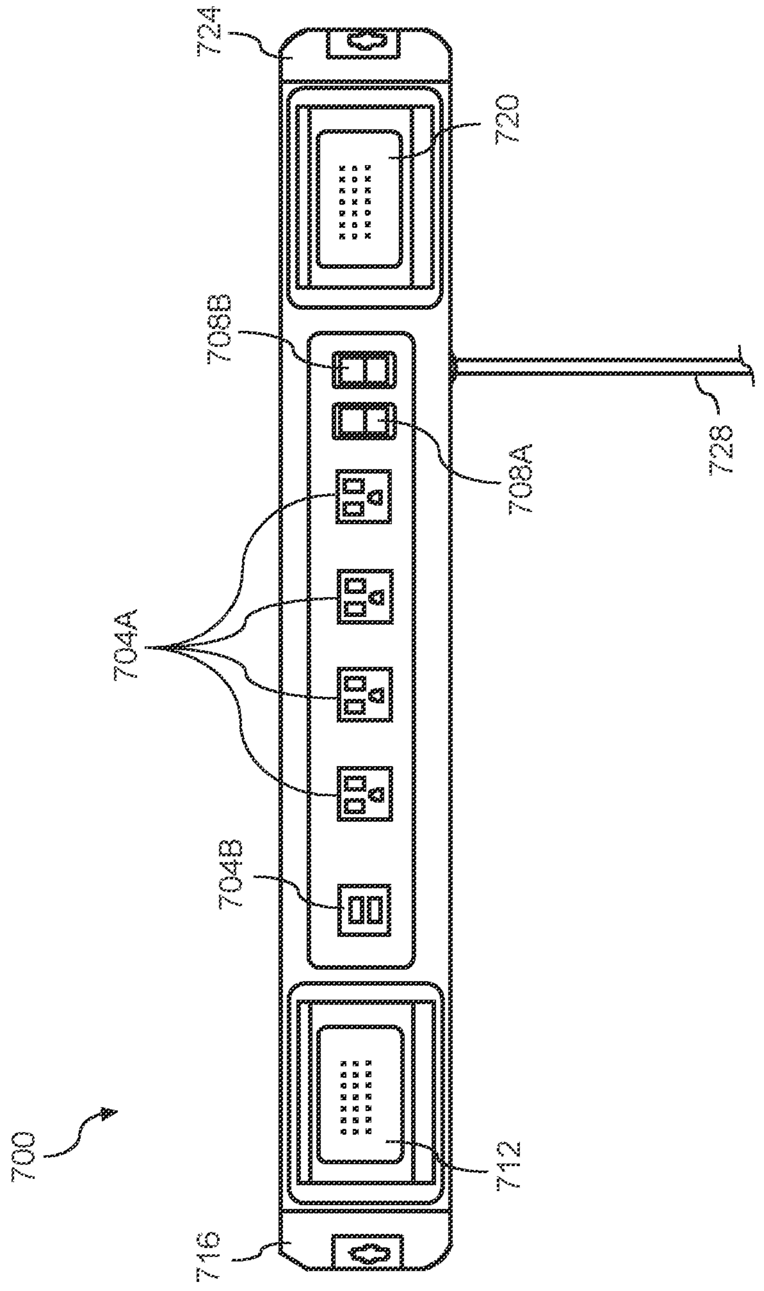
FIG. 7A is a top view of a power strip with lights in accordance with embodiments of the present disclosure.

With reference to FIG. 7A, another embodiment of a storage light is illustrated including a power strip 700 that may be coupled to a modular storage system (e.g., any of the modular storage systems 104, 204, 304, 404, 504), a hanger, or other feature for suspending the power strip 700. In some embodiments, the power strip 700 may be mountable via one or more keyholes (not illustrated).

The power strip 700 can include a plurality of ports 704A and 704B, such as high voltage ports 704A, low voltage ports 704B (e.g., USB ports), or a combination thereof. In some embodiments, the high voltage ports 704A are turned on and off by a switch 708A, and the low voltage ports 704B are turned on and off by a switch 708B. Alternatively, all of the high voltage ports 704A and the low voltage ports 704B, or a different sub-combination of high voltage ports 704A and low voltage ports 704B, may be turned on and off by a single switch (e.g., either 708A or 708B). As illustrated in FIG. 7A, a first light 712 is disposed at a first end 716 of the power strip 700 and a second light 720 is disposed at a second end 724 of the power strip 700. The first light 712 and second light 720 pivot relative to the power strip 700 to provide flexibility for where the light may be directed. The power strip 700 receives power from an alternating current (AC) power source via a cord 728 and distributes power through the ports 704A and 704B.

Figure 7B:
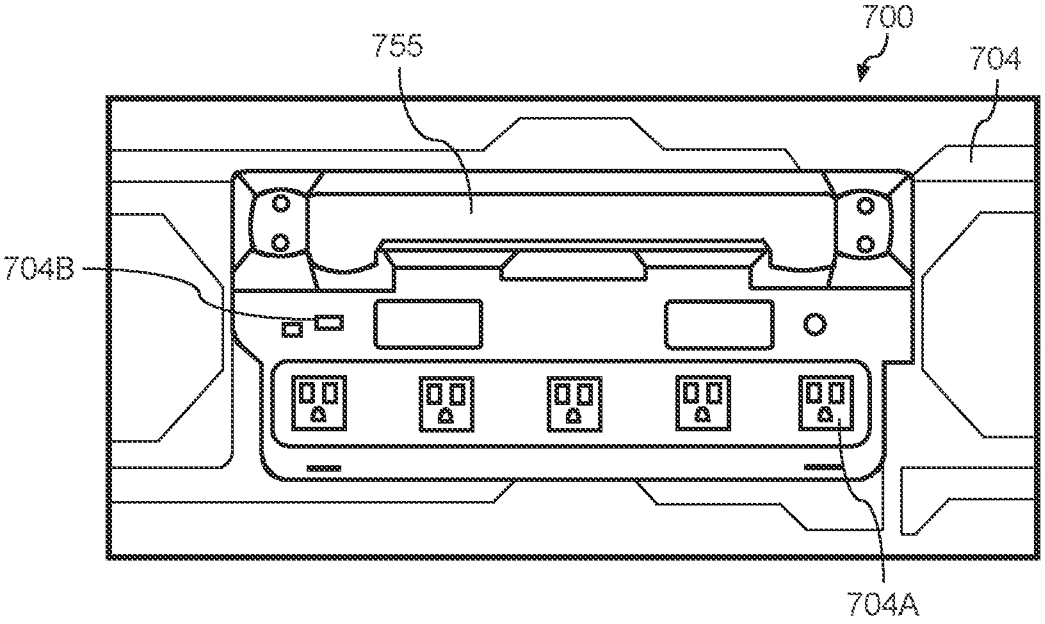
FIG. 7B is a front view of another power strip with lights in accordance with embodiments of the present disclosure.
Figure 7C:
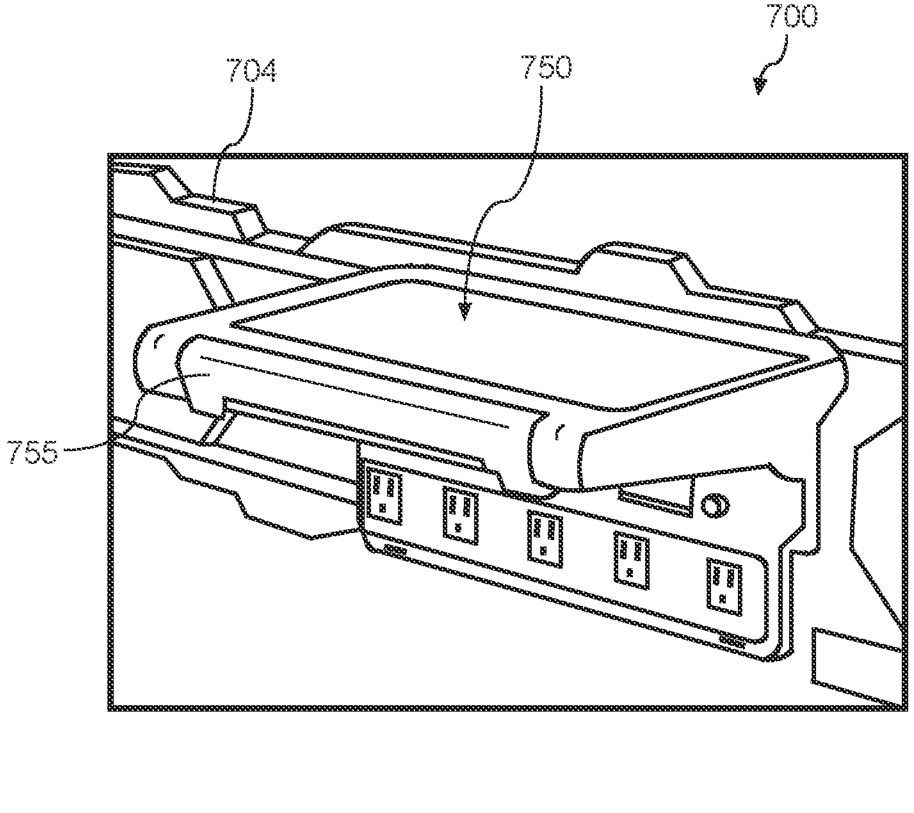
FIG. 7C is a perspective view of the power strip of FIG. 7B in accordance with embodiments of the present disclosure.

With reference to FIGS. 7B and 7C, another power strip 700' is shown that may be coupled to a modular storage system 704 (or any of the modular storage systems 104, 204, 304, 404, 504), a hanger, or other feature for suspending the power strip 700'. Compared to the power strip 700 in FIG. 7A, the power strip 700' in FIGS. 7B and 7C includes a shelf 750 that extends away from the power strip 700', opposite from the modular storage system 704. The shelf 750 may be used for storing or holding items while the power strip 700' is releasably coupled to the modular storage system 704. The power strip 700' further includes a light source, such as a light bar 755, for illuminating the ports on the power strip 700', or for otherwise illuminating the area under the shelf 750. For instance, the light bar 755 may be disposed at a front edge 751 of the shelf 750, distal the modular storage system 704. In some embodiments, the light bar 755 or other light source may be rotatable relative to the shelf 750 or other component of the power strip 700', such as by being able to pivot 90 degrees, 180 degrees, or more.

Figure 8A:
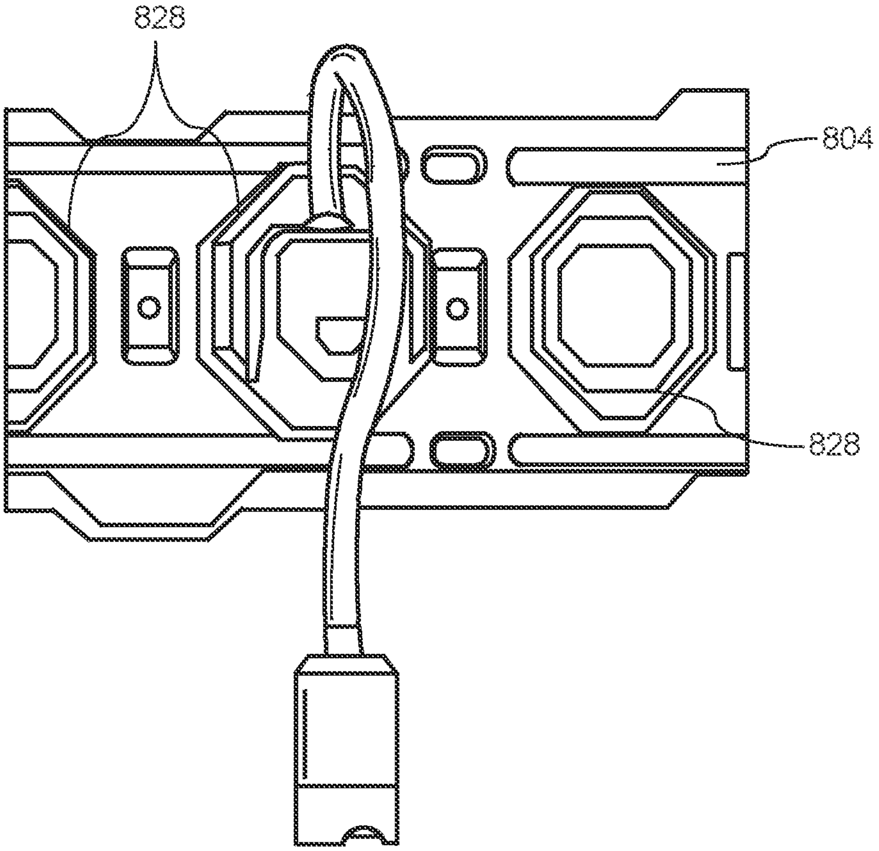
FIG. 8A is a perspective view of an exemplary modular storage system including a rail in accordance with embodiments of the present disclosure.
Figure 8B:
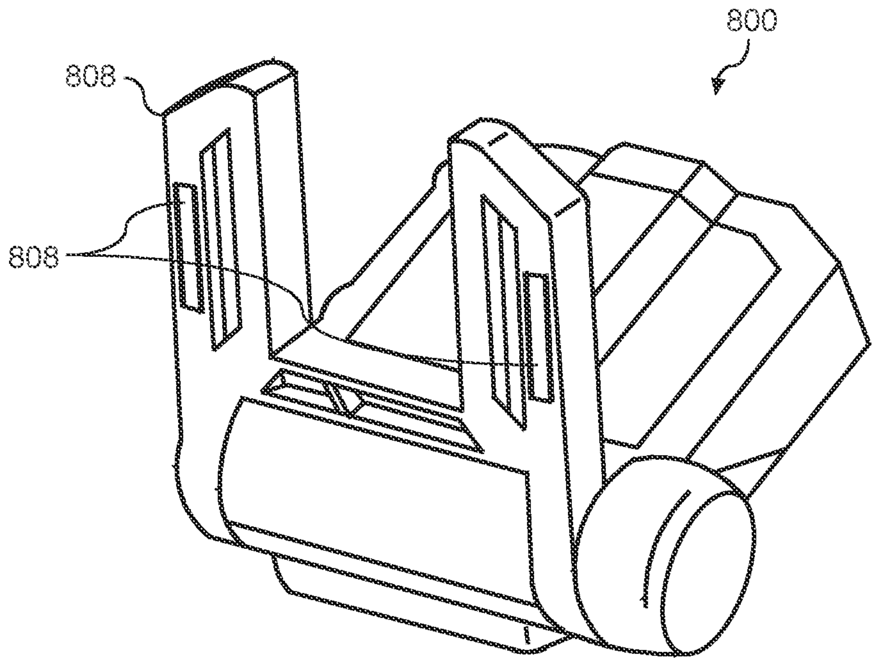
FIG. 8B is a perspective view of a flip light in accordance with embodiments of the present disclosure.
Figure 8C:
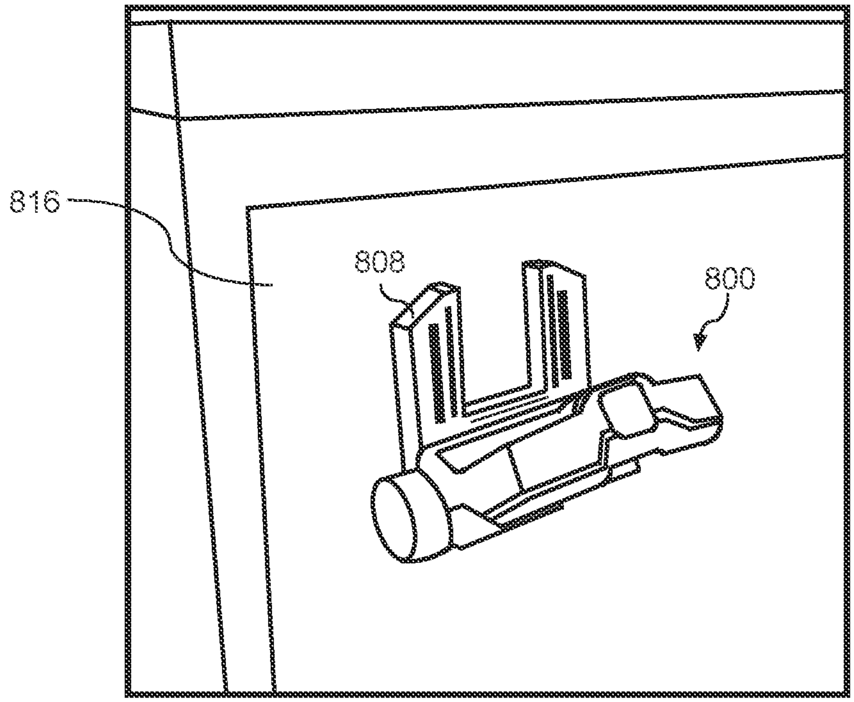
FIG. 8C is a perspective view of a flip light coupled to a surface in accordance with embodiments of the present disclosure.

With reference to FIGS. 8A-8F, another embodiment of a storage light is illustrated including a flip light 800 that may be coupled to a modular storage system, such as modular storage system 804 (illustrated as a horizontal rail) shown in FIG. 8A. As shown in FIG. 8B, the flip light 800 can include a base 808 supporting a plurality of magnets 812 disposed in the base 808. The base 808 provides support for the flip light 800 to stand or rest on a surface independent of the modular storage system 804. As shown in FIG. 8C, the flip light 800 may instead by coupled to a surface 816 having a ferrous composition by magnetic interaction of the magnets 812 with the ferrous material.

Figure 8D:
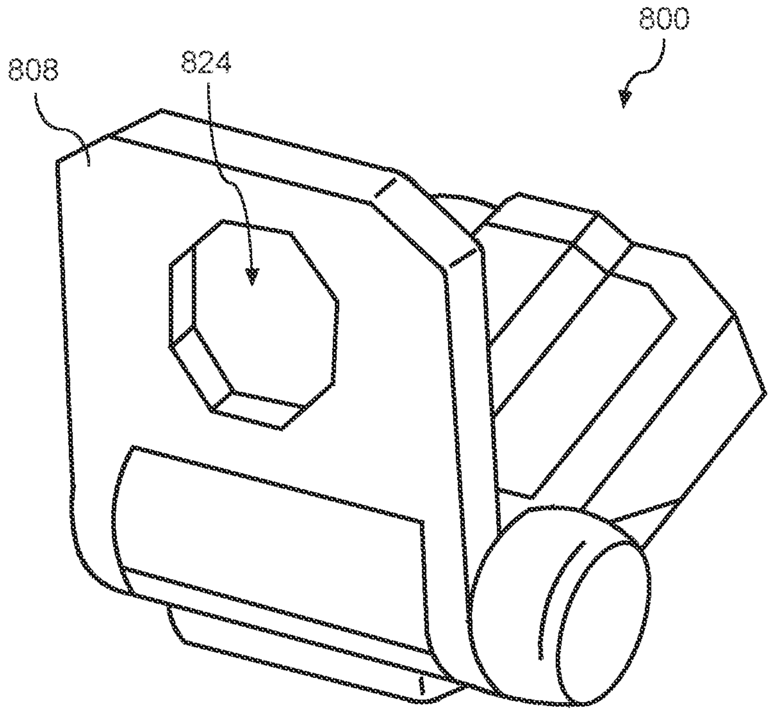
FIG. 8D is a perspective view of a flip light including a base in accordance with embodiments of the present disclosure.
Figure 8E:
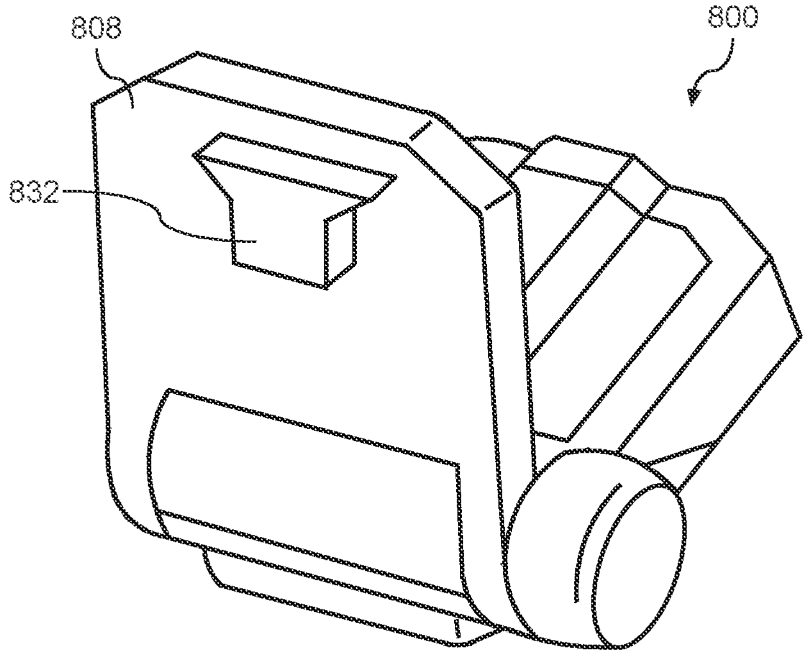
FIG. 8E is a perspective view of a flip light including another base in accordance with embodiments of the present disclosure.

With reference to FIG. 8D, a first embodiment of the base 808*a* is shown. The base 808*a* has a recess 824 that is attachable to the commonly shaped mounting interface 828 of the modular storage system 804. The recess 824 complements the commonly shaped mounting interface 828 for attachment of the base 808*a* to the commonly shaped mounting interface 828. When the base 808*a* is attached to the commonly shaped mounting interface 828, a clip or detent feature (not shown) may engage the commonly shaped mounting interface 828 to resist removal of the flip light 800 from the modular storage system 804 absent sufficient force. FIG. 8E illustrates another embodiment of the base 808*b* that has an engagement portion 832 extending outward from the base 808*b*. The engagement portion 832 fits between and engages adjacent commonly shaped mounting interfaces 828 of the modular storage system 804.

Figure 8F:
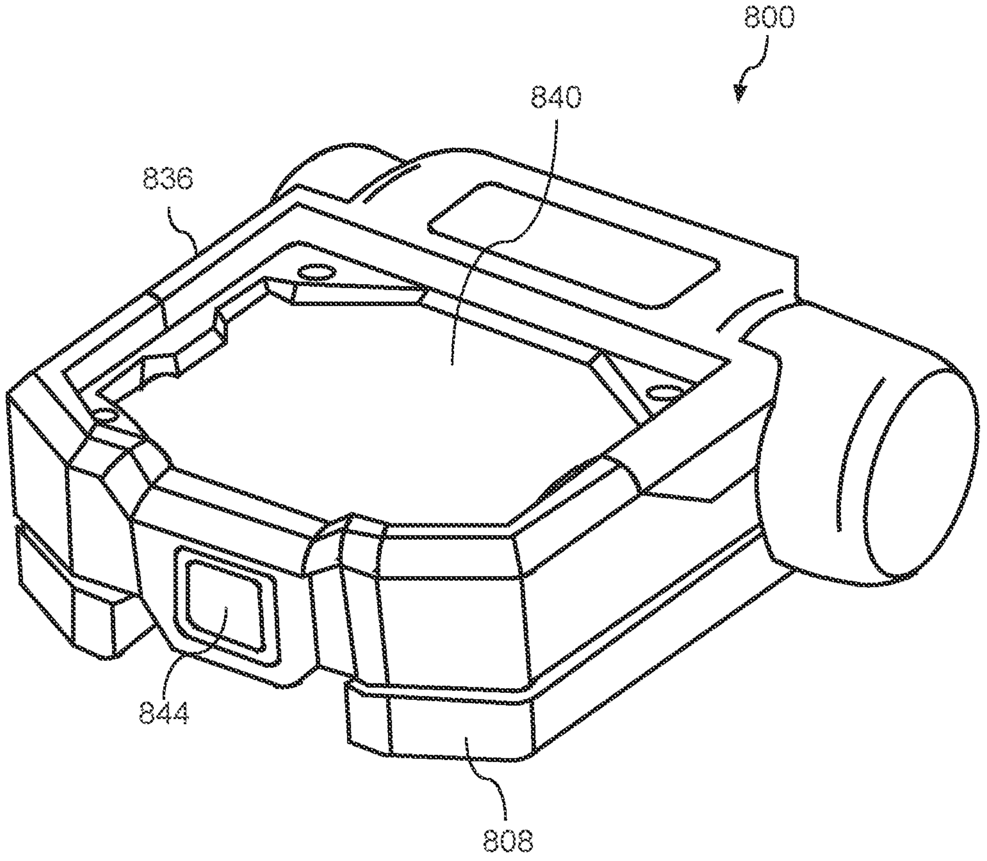
FIG. 8F is a perspective view of a light in accordance with embodiments of the present disclosure.

With reference to FIGS. 8B and 8F, a light head 836 is pivotally coupled to the base 808 so that the light head 836 may move from a collapsed or compact position as shown in FIG. 8F to an extended position. The light head 836 includes a light source 840 (e. g., LEDs coupled to a LED board) and a switch 844 for turning the flip light 800 on and off.

The storage lights as embodied in this disclosure are configured to function while coupled with the modular storage system, while suspended or coupled to other systems, or self-supported on a surface. The storage lights may include LEDs as a light source. The storage lights may be operable in one brightness setting. The storage lights may instead have more than one brightness setting, for instance, a high level of brightness and a lower level of brightness.

Further aspects of the invention are provided by one or more of the following embodiments:

A storage light assembly is disclosed for a modular storage system having a plurality of commonly shaped mounting interfaces. The storage light assembly includes a light source; and a base connected to the light source, wherein the base comprises an engagement structure complementary to the commonly shaped mounting interface such that the storage light assembly can be releasably coupled to any of the plurality of commonly shaped mounting interfaces on the modular storage system.

The storage light assembly of any clause herein, wherein the base of the storage light assembly comprises a loop.

The storage light assembly of any clause herein, further comprising a hook pivotably attached to the base.

The storage light assembly of any clause herein, wherein the engagement structure comprises a recessed mounting structure defined by the base.

The storage light assembly of any clause herein, wherein the engagement structure comprises an engagement portion protruding from the base.

The storage light assembly of any clause herein, wherein the light source comprises one or more light emitting diodes.

The storage light assembly of any clause herein, wherein the light source further comprises a lens at least partially covering the one or more light emitting diodes.

The storage light assembly of any clause herein, wherein the lens is depressible to change a power state of the one or more light emitting diodes.

The storage light assembly of any clause herein, wherein the base comprises a detent feature that resists decoupling of the storage light assembly from the commonly shaped mounting interface when a force is applied in at least one direction.

The storage light assembly of any clause herein, wherein the base comprises a size that is substantially similar to the commonly shaped mounting interface.

The storage light assembly of any clause herein, wherein the detent feature comprises a flexible clip.

The storage light assembly of any clause herein, wherein the base comprises a size that is longer in at least one dimension than the commonly shaped mounting interface.

The storage light assembly of any clause herein, wherein the base comprises a detent feature comprising a bracket.

The storage light assembly of any clause herein, wherein the light source is separated from the base via a flexible neck.

The storage light assembly of any clause herein, wherein the light source is pivotably connected to the base.

The storage light assembly of any clause herein, wherein the base comprises a first portion and a second portion having a hinged connection therebetween that imposes a biasing force pushing the first portion and the second portion into a closed position.

The storage light assembly of any clause herein, wherein the first portion comprises the engagement structure, and wherein the light source is connected to the second portion.

The storage light assembly of any clause herein, wherein the light source is separated from the base via a yoke.

The storage light assembly of any clause herein, wherein the light source is pivotably connected to the yoke.

The storage light assembly of any clause herein, wherein the yoke is pivotably connected to the base.

The storage light assembly of any clause herein, wherein the base comprises a first mount piece and a second mount piece that are hinged together to define a recessed mounting structure.

The storage light assembly of any clause herein, wherein the base comprises a power strip comprising a plurality of ports.

The storage light assembly of any clause herein, wherein the plurality of ports comprise one or more low voltage ports and one or more high voltage ports.

The storage light assembly of any clause herein, wherein the base comprises a first light source at a first end of the power strip, and a second light source at a second end of the power strip.

The storage light assembly of any clause herein, wherein the light source is pivotably connected to an edge of the base.

The storage light assembly of any clause herein, wherein the engagement structure comprises a recessed mounting structure defined in the base.

The storage light assembly of any clause herein, wherein the engagement structure comprises an engagement portion protruding from the base.

The storage light assembly of any clause herein, wherein the base comprises one or more magnets.

A modular storage system is disclosed. The modular storage system includes a mounting structure comprising a plurality of mounting locations each having a commonly shaped mounting interface; and a storage light comprising a light source and a base, wherein the base comprises an engagement structure complementary to the commonly shaped mounting interface such that the storage light can be releasably coupled to any of the plurality of mounting locations on the mounting structure.

The modular storage system of any clause herein, wherein the mounting structure comprises a lid pivotably coupled to a container.

The modular storage system of any clause herein, wherein the mounting structure comprises a rail.

The modular storage system of any clause herein, wherein the base of the storage light comprises a loop.

The modular storage system of any clause herein, wherein the storage light further comprises a hook pivotably attached to the base.

The modular storage system of any clause herein, wherein the engagement structure comprises a recessed mounting structure defined by the base.

The modular storage system of any clause herein, wherein the engagement structure comprises an engagement portion protruding from the base.

The modular storage system of any clause herein, wherein the light source comprises one or more light emitting diodes.

The modular storage system of any clause herein, wherein the light source further comprises a lens at least partially covering the one or more light emitting diodes.

The modular storage system of any clause herein, wherein the lens is depressible to change a power state of the one or more light emitting diodes.

The modular storage system of any clause herein, wherein the base of the storage light comprises a detent feature that resists decoupling of the storage light from one of the plurality of mountings locations when a force is applied in at least one direction.

The modular storage system of any clause herein, wherein the base of the storage light comprises a size that is substantially similar to the commonly shaped mounting interface.

The modular storage system of any clause herein, wherein the detent feature comprises a flexible clip.

The modular storage system of any clause herein, wherein the base of the storage light comprises a size that is longer in at least one dimension than the commonly shaped mounting interface.

The modular storage system of any clause herein, wherein the base of the storage light comprises a detent feature comprising a bracket.

The modular storage system of any clause herein, wherein the light source is separated from the base via a flexible neck.

The modular storage system of any clause herein, wherein the light source is pivotably connected to the base.

The modular storage system of any clause herein, wherein the base comprises a first portion and a second portion having a hinged connection therebetween that imposes a biasing force pushing the first portion and the second portion into a closed position.

The modular storage system of any clause herein, wherein the first portion comprises the engagement structure, and wherein the light source is connected to the second portion.

The modular storage system of any clause herein, wherein the light source is separated from the base via a yoke.

The modular storage system of any clause herein, wherein the light source is pivotably connected to the yoke.

The modular storage system of any clause herein, wherein the yoke is pivotably connected to the base.

The modular storage system of any clause herein, wherein the mounting structure comprising the commonly shaped mounting interface comprises a plurality of ribs, and wherein the engagement structure comprises a channel that is engageable with the plurality of ribs.

The modular storage system of any clause herein, wherein the channel is engageable with the plurality of ribs via a frictional fit.

The modular storage system of any clause herein, wherein the channel is engageable with the plurality of ribs via an interference fit.

The modular storage system of any clause herein, wherein the mounting structure comprises an elongated shaft, and wherein the plurality of mounting locations comprises a length of the elongated shaft.

The modular storage system of any clause herein, wherein the base comprises a first mount piece and a second mount piece that are hinged together to define a recessed engagement structure that is complementary to the elongated shaft.

The modular storage system of any clause herein, wherein the elongated shaft comprises a portion of a handle structure.

The modular storage system of any clause herein, wherein the base comprises a power strip comprising a plurality of ports.

The modular storage system of any clause herein, wherein the plurality of ports comprise one or more low voltage ports and one or more high voltage ports.

The modular storage system of any clause herein, wherein the base comprises a first light source at a first end of the power strip, and a second light source at a second end of the power strip.

The modular storage system of any clause herein, wherein the light source is pivotably connected to an edge of the base.

The modular storage system of any clause herein, wherein the engagement structure comprises a recessed mounting structure defined in the base.

The modular storage system of any clause herein, wherein the engagement structure comprises an engagement portion protruding from the base.

The modular storage system of any clause herein, wherein the base comprises one or more magnets.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A modular storage system comprising:

a planar mounting structure comprising a plurality of mounting locations each having a commonly shaped mounting interface protruding from a plane of the mounting structure; and a storage light comprising a light source and a base, wherein the base comprises an engagement structure complementary to the commonly shaped mounting interface such that the storage light can be releasably coupled to any of the plurality of mounting locations on the mounting structure, wherein the engagement structure comprises a recessed mounting structure defined by the base, wherein the engagement structure comprises a plurality of sides each oriented at non-perpendicular angles relative to each adjacent side.

2. The modular storage system of claim 1, wherein the mounting structure comprises a lid pivotably coupled to a container.

3. The modular storage system of claim 1, wherein the mounting structure comprises a rail.

4. The modular storage system of claim 1, wherein the light source is separated from the base via a flexible neck.

5. The modular storage system of claim 1, wherein the light source is pivotably connected to the base.

6. The modular storage system of claim 1, wherein the mounting structure comprising the commonly shaped mounting interface comprises a plurality of ribs, and wherein the engagement structure comprises a channel that is engageable with the plurality of ribs.

7. The modular storage system of claim 6, wherein the channel is engageable with the plurality of ribs via a frictional fit.

8. The modular storage system of claim 1, wherein the mounting structure comprises an elongated shaft, and wherein each of the plurality of mounting locations comprises a length of the elongated shaft.

9. The modular storage system of claim 8, wherein the base comprises a first mount piece and a second mount piece that are hinged together to define a recessed engagement structure that is complementary to the elongated shaft.

10. The modular storage system of claim 1, wherein the base comprises a power strip comprising a plurality of ports.

* * * * *